US010151575B2

(12) United States Patent
Chikaoka et al.

(10) Patent No.: US 10,151,575 B2
(45) Date of Patent: Dec. 11, 2018

(54) POSITION SENSING DEVICE AND POSITION SENSING METHOD

(71) Applicant: Funai Electric Co., Ltd., Daito, Osaka (JP)

(72) Inventors: Atsuhiko Chikaoka, Kyoto (JP); Ken Nishioka, Osaka (JP); Kenji Nagashima, Osaka (JP); Kazuhiro Takahashi, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/091,103

(22) Filed: Apr. 5, 2016

(65) Prior Publication Data
US 2016/0298954 A1 Oct. 13, 2016

(30) Foreign Application Priority Data

Apr. 10, 2015 (JP) ................... 2015-081199

(51) Int. Cl.
*G01B 11/14* (2006.01)
*G01B 11/00* (2006.01)
(Continued)

(52) U.S. Cl.
CPC .......... *G01B 11/002* (2013.01); *G01S 7/4815* (2013.01); *G01S 7/499* (2013.01);
(Continued)

(58) Field of Classification Search
CPC ....... G06T 7/00; G06F 3/0423; G06F 3/0325; G06F 3/03545; G01B 11/002; G01B 11/24; G01B 11/14; G01S 17/48; G01S 17/66
(Continued)

(56) References Cited

U.S. PATENT DOCUMENTS 4,294,543 A * 10/1981 Apple ................... G06F 3/0423
178/18.09
4,808,003 A * 2/1989 Kessels .................. G01B 11/24
356/609
(Continued)

FOREIGN PATENT DOCUMENTS

| CN | 101582001 A | 11/2009 |
| CN | 104076581 A | 10/2014 |

(Continued)

OTHER PUBLICATIONS

Extended European Search Report of the corresponding European Application No. 16164186.5, dated Aug. 19, 2016.
(Continued)

*Primary Examiner* — Hoa Pham
(74) *Attorney, Agent, or Firm* — Global IP Counselors, LLP

(57) ABSTRACT

A position sensing device includes at least one light receiver, and a processor. The light receiver receives lights that are emitted from a plurality of light exit positions of a scanning light source component to scan a predetermined area and are reflected by a sensing object within the predetermined area. The processor controls the scanning light source component, and senses position of the sensing object based on a light reception signal of the light receiver. The processor further determines from which of the scanning lights the light reception signal is obtained, and senses the position of the sensing object based on optical paths of the scanning lights.

18 Claims, 32 Drawing Sheets

(51) Int. Cl.
*G06F 3/042* (2006.01)
*G01S 17/42* (2006.01)
*G01S 17/46* (2006.01)
*G01S 7/481* (2006.01)
*G01S 7/499* (2006.01)

(52) U.S. Cl.
CPC .............. *G01S 17/42* (2013.01); *G01S 17/46* (2013.01); *G06F 3/0423* (2013.01)

(58) Field of Classification Search
USPC .......... 356/614–623, 141.1, 3.1, 141.4, 3.09; 345/156, 175; 250/221, 559.29
See application file for complete search history.

(56) References Cited

U.S. PATENT DOCUMENTS

| | | | | |
|---|---|---|---|---|
| 5,148,016 | A * | 9/1992 | Murakami | G06F 3/0423 250/221 |
| 5,414,517 | A * | 5/1995 | Furuhashi | G01B 11/245 250/234 |
| 6,195,019 | B1 * | 2/2001 | Nagura | G07B 15/063 235/384 |
| 2005/0052635 | A1 * | 3/2005 | Xie | G01S 17/48 356/3.07 |
| 2010/0182280 | A1 * | 7/2010 | Juni | G06F 3/0416 345/175 |
| 2011/0128554 | A1 | 6/2011 | Nakanishi | |
| 2011/0227874 | A1 * | 9/2011 | Fahraeus | G06F 3/0421 345/175 |
| 2013/0038577 | A1 * | 2/2013 | Chen | G06F 3/042 345/175 |
| 2014/0091200 | A1 | 4/2014 | Cheng | |
| 2014/0118304 | A1 * | 5/2014 | Chang | G06F 3/0423 345/175 |
| 2015/0260845 | A1 * | 9/2015 | Takemura | G01S 17/48 356/3.11 |
| 2017/0351338 | A1 * | 12/2017 | Bondan | G06F 3/03 |

FOREIGN PATENT DOCUMENTS

| | | |
|---|---|---|
| EP | 1512989 A2 | 3/2005 |
| JP | 2013-080516 A | 5/2013 |
| JP | 2014-154063 A | 8/2014 |

OTHER PUBLICATIONS

Douglas B. Murphy, et al., Basic Aspects of Lights Filters, Olumpus Microscopy Resource Center website, 2012, Olumpus America Inc., U.S.A.

Kenneth R. Spring, et al., Introduction to Prisms and Beamsplitters, Olumpus Microscopy Resource Center website, 2012, Olumpus America Inc., U.S.A.

* cited by examiner

TABLE OF FIRST LIGHT EXIT POSITION COORDINATES

TABLE OF SECOND LIGHT EXIT POSITION COORDINATES

POSITION SENSING DEVICE AND POSITION SENSING METHOD

CROSS-REFERENCE TO RELATED APPLICATIONS

This application claims priority to Japanese Patent Application No. 2015-081199 filed on Apr. 10, 2015. The entire disclosure of Japanese Patent Application No. 2015-081199 is hereby incorporated herein by reference.

BACKGROUND

Field of the Invention

This invention generally relates to a position sensing device. More specifically, the present invention relates to a position sensing device that scans a sensing area with test light and senses the position of a sensing object by detecting reflected light and/or scattered light from the sensing object within the sensing area. Also, the present invention relates to a spatial input device that senses input to a spatial image formed within a space, and a processor.

Background Information

Generally, a position sensing device has been proposed in which a specific area is scanned and the movement of a hand, finger, or the like within this specific area is sensed (see, for example, Japanese Laid-Open Patent Application Publication Nos. 2013-80516 (Patent Literature 1) and 2014-154063 (Patent Literature 2)).

With Patent Literature 1, light source units that emit illumination light that is scanned over a coordinate input plane are provided at two locations, recursive reflection is received from a recursive reflective member attached to a coordinate support (such as a finger or an electronic stylus) inserted into the coordinate input plane, and the position (coordinates) of the coordinate support is sensed from the timing at which the reflected light is received.

With Patent Literature 2, a specific scan area is scanned with a detection wave (such as infrared light with a wavelength of 780 nm), an input device is attached to the user's finger, and the infrared light is detected with a light receiving element provided to the input device, thereby detecting that the input device is within the operation area, and a piezoelectric element is vibrated to notify the user that the input device is within the scan area.

SUMMARY

With the configuration discussed in Patent Literature 1, however, two-dimensional coordinates within the coordinate input plane are sensed, but positions (coordinates) cannot be sensed in three-dimensional space.

Also, with the configuration discussed in Patent Literature 2, whether or not an input device is within an assumed scan region in three-dimensional space can be confirmed, but a three-dimensional position (coordinates) at a given point within a specific area cannot be sensed. Also, since the position of an input device in the scan region is sensed, this input device is required.

In view of this, it is an object to provide a position sensing device with which members can be laid out with greater freedom, and the position of a sensing object in a sensing area can be sensed accurately.

It is another object to provide a spatial input device with which input from the user's finger to a spatial image can be reliably detected with a simple configuration.

In view of the state of the known technology, a position sensing device is provided that includes at least one light receiver, and a processor. The light receiver receives lights that are emitted from a plurality of light exit positions of a scanning light source component to scan a predetermined area and are reflected by a sensing object within the predetermined area. The processor controls the scanning light source component, and senses position of the sensing object based on a light reception signal of the light receiver. The processor further determines from which of the scanning lights the light reception signal is obtained, and senses the position of the sensing object based on optical paths of the scanning lights.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
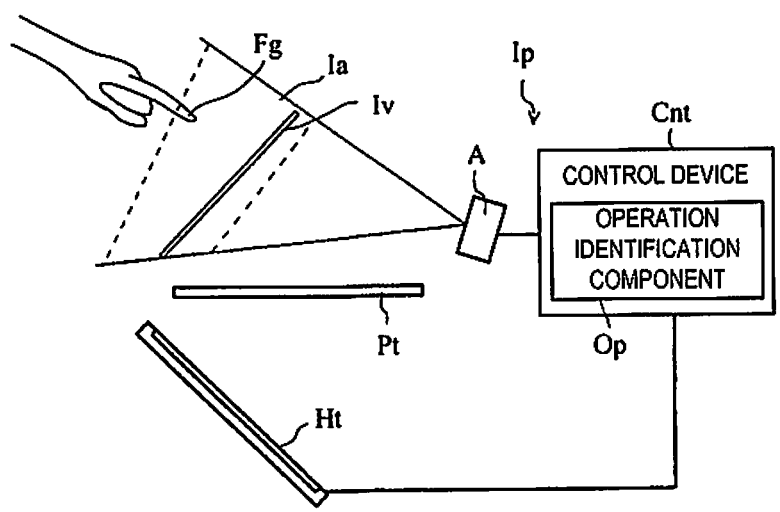
FIG. 1 is a simplified diagram of the spatial input device in accordance with a first embodiment.

FIG. 1 is a simplified diagram of the spatial input device in accordance with a first embodiment. As shown in FIG. 1, the spatial input device Ip detects operation input produced by an operation object (the user's finger Fg) of a spatial image Iv displayed in a operation input space Ia by a spatial imaging plate Pt (e.g., image formation component). The spatial input device Ip includes the position sensing device A in accordance with this embodiment, and a control device Cnt. The operation input detected by the spatial input device Ip is sent to a personal computer, a game device, or another such host device Ht.

Upon sensing that the user's finger Fg has been inserted into the operation input space Ia, the position sensing device A computes the three-dimensional coordinates of the user's finger Fg, and transfers this to the control device Cnt (an external device). The control device Cnt includes an operation identification component Op that identifies operation by the user's finger Fg from the data for the transferred three-dimensional coordinates. The operation identification component Op performs, for example, gesture recognition by using changes in the coordinates and changes in the position over time, touch recognition by detecting the passage of a reference plane, or the like, and produces input operation information that is a combination of data for the three-dimensional coordinates and input events for information about what kind of operation input is performed. The operation identification component Op then hands the input operation information over to the host device Ht.

The operation input of the host device Ht can be performed with a virtual operation device (the spatial image Iv) displayed in space, by using the spatial input device Ip. With the spatial input device Ip, the position sensing device A and the control device Cnt (mainly the operation identification component Op) are described as being separate, but they may instead be integrated.

Figure 2:
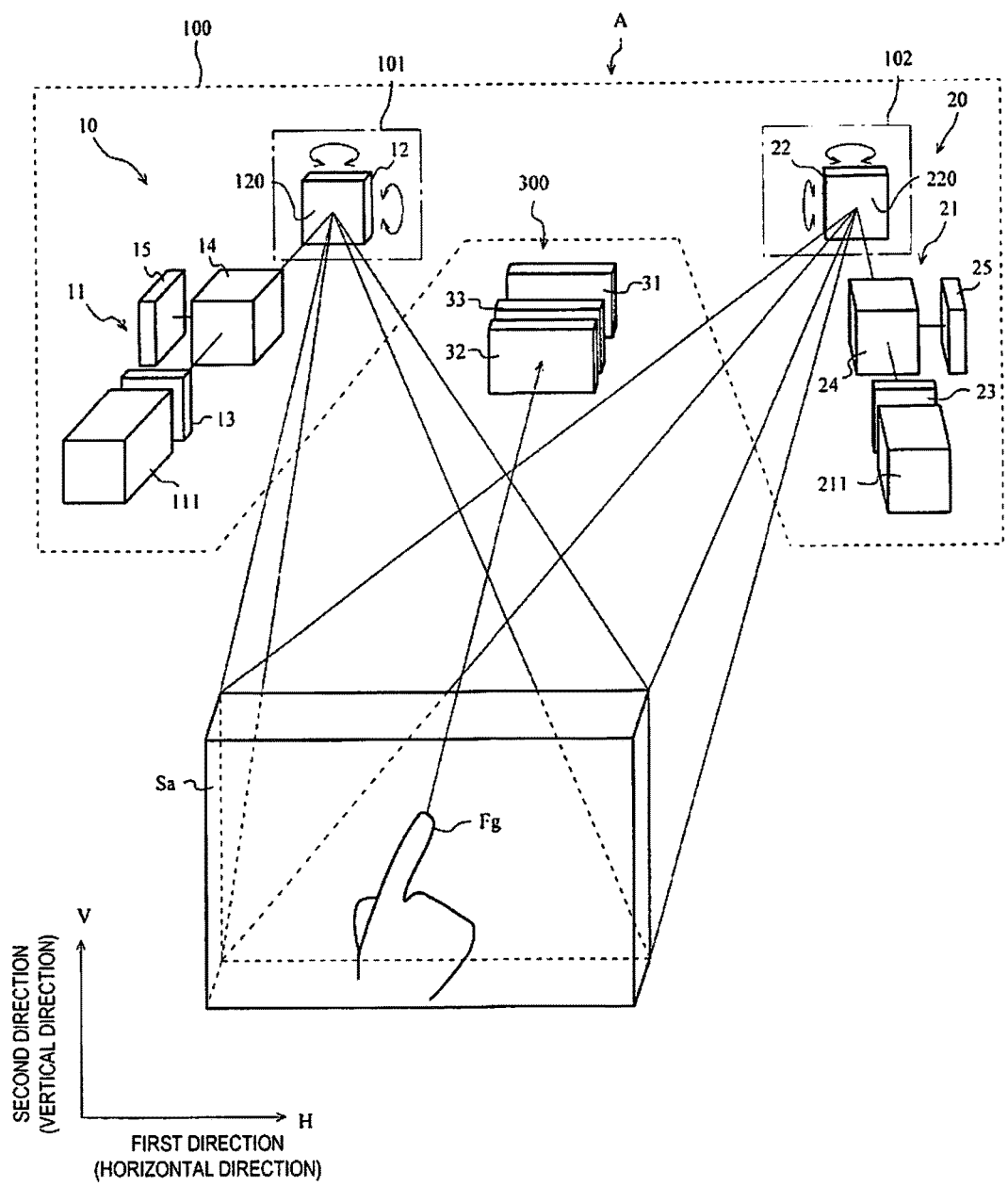
FIG. 2 is a simplified configuration diagram of the position sensing device.
Figure 3:
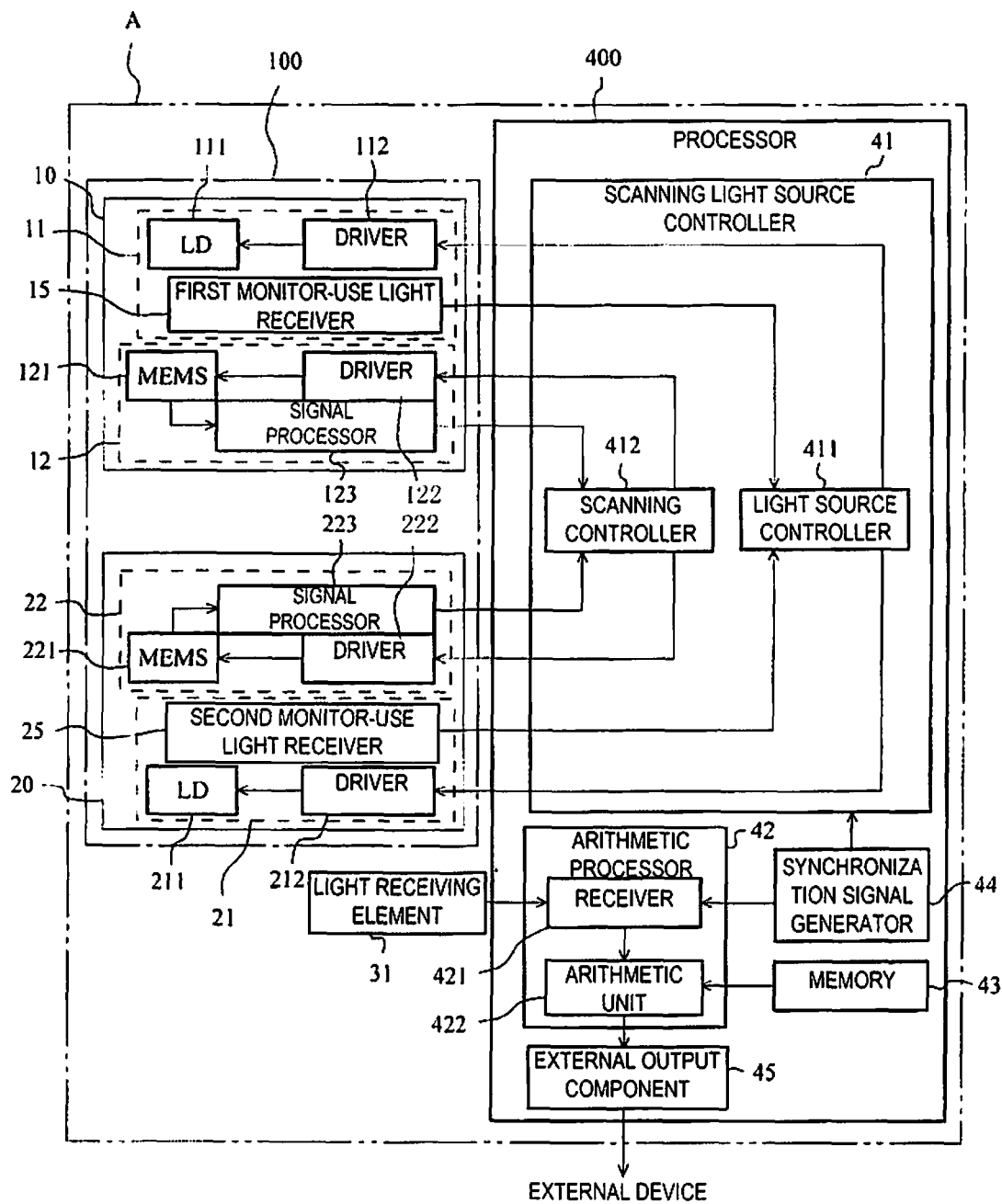
FIG. 3 is a block diagram of the electrical connections of the position sensing device shown in FIG. 2.

The position sensing device in this embodiment will now be described through reference to the drawings. FIG. 2 is a simplified configuration diagram of the position sensing device. FIG. 3 is a block diagram of the electrical connections of the position sensing device shown in FIG. 2. The position sensing device A shown in FIGS. 2 and 3 includes a light receiver 300, and a processor 400. In the illustrated embodiment, the position sensing device A includes a scanning light source component 100.

The position sensing device A scans a sensing area Sa with test light (e.g., scanning light) emitted from the scanning light source component 100. When the test light shines on an object that has entered the sensing area Sa (such as the user's finger Fg), the light reflected or scattered by the user's finger Fg is received by the light receiver 300. The light receiver 300 sends the processor 400 light reception information indicating that reflected or scattered light has been received, and the processor 400 acquires position information (coordinate information with respect to a certain reference, such as the light receiver 300) based on the light reception information. The various components will now be described in detail.

The scanning light source component 100 emits test light that is two-dimensionally scanned over the sensing area Sa. The scanning light source component 100 includes two light exit positions from which the test lights (e.g., scanning lights) exit. The light exit positions here will be described as a first light exit position 101 on the left and a second light exit position 102 on the right in the scanning light source component 100 shown in FIG. 1.

The scanning light source component 100 has a first optical system 10 that emits test light from the first light exit position 101 toward the sensing area Sa, and a second optical system 20 that emits test light from the second light exit position 102 toward the sensing area Sa.

The first optical system 10 includes a first light source component 11 and a first test light generator 12 (e.g., scanning light generator). The first light source component 11 includes a light source that emits infrared light (laser light) with a wavelength in the infrared band. Since infrared light is of a wavelength that cannot be seen by the user, the position of the user's finger Fg can be sensed without being noticed by the user. As shown in FIGS. 2 and 3, the first light source component 11 includes a laser light emitting element (LD; laser diode) 111, a driver 112, a first lens 13, a first beam splitter 14, and a first monitor-use light receiver 15.

The first light source component 11 here is equipped with the laser light emitting element 111, but is not limited to this, and any configuration with which infrared light of the specified wavelength can be emitted at a specific output or higher can be employed.

The emission of the first light source component 11 is controlled by a light source controller 411 (discussed below) of a scanning light source controller 41. The laser light emitting element 111 is driven by a signal (power) from the driver 112, and the driver 112 generates a drive signal for driving the laser light emitting element 111, based on a control signal (emission signal) from the light source controller 411. The intensity, timing, and so forth at which the infrared light is emitted from the laser light emitting element 111 can be adjusted in this way.

The laser light emitting element 111 is a point light source, and the emitted infrared light is scattered light. Accordingly, with the first light source component 11, infrared light emitted from the laser light emitting element 111 is transmitted by the first lens 13 and converted into parallel or substantially parallel light. The first lens 13 is a collimator lens.

The infrared light emitted from the first lens 13 is incident on the first beam splitter 14. The first beam splitter 14 reflects part of the incident infrared light, and transmits the rest. The light reflected by the first beam splitter 14 is incident on the first monitor-use light receiver 15. The first monitor-use light receiver 15 sends a monitor signal based on the incident light to the light source controller 411 of the scanning light source controller 41.

The light transmitted by the first beam splitter 14 is incident on the first test light generator 12. The first test light generator 12 reflects the incident light, moves the optical axis of the reflected light in a first direction (the horizontal direction H in FIG. 2) and in a second direction that is perpendicular to the first direction (the vertical direction V in FIG. 2), and thereby produces test light. The optical axis of the test light moves in the first and second directions, and the sensing area Sa is scanned two-dimensionally by the test light. The scanning of the sensing area Sa with the test light will be discussed below.

Figure 4:
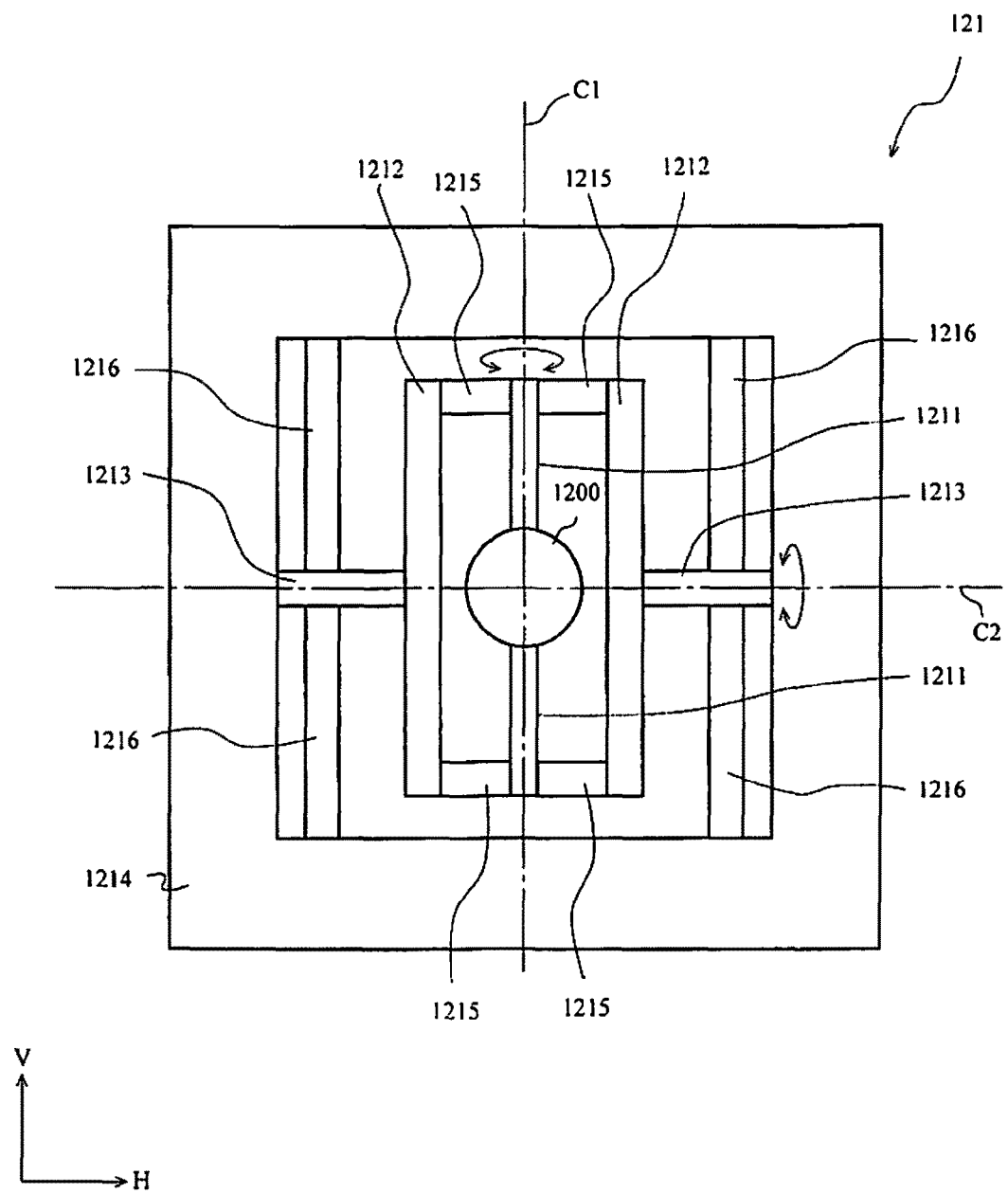
FIG. 4 is a simplified plan view of an MEMS equipped with a piezoelectric actuator.

The first test light generator 12 generates test light by shaking a reflective face 120 that reflects incident light, in the first and second directions. The first test light generator 12 includes an element (MEMS: micro-electromechanical system) 121 that pivots the reflective face 120, a driver 122, and a signal processor 123. The MEMS will now be described through reference to the drawings. FIG. 4 is a simplified plan view of an MEMS equipped with a piezoelectric actuator.

As shown in FIG. 4, the element 121 pivots a mirror 1200 equipped with the reflective face 120 in the first direction (H direction) and the second direction (V direction) and thereby deflects the optical axis of the reflected light. The MEMS 121 includes the mirror 1200, a first elastic deformation part 1211, pivot supports 1212, a second elastic deformation part 1213, a frame 1214, first actuators 1215, and second actuators 1216. In FIG. 4, the lateral direction is the first direction (H direction) and the vertical direction is the second direction (V direction).

The mirror 1200 is a disk-shaped member in which the reflective face 120 is formed on one of the main faces (here, the face on the side toward the viewer of the drawing). The first elastic deformation part 1211 is linked to the mirror 1200 at both distal end portions in the second direction. That is, the mirror 1200 is linked to the center portion in the second direction of the first elastic deformation part 1211. The pivot supports 1212 are configured to be able to twist elastically, and the mirror 1200 and the pivot supports 1212 are able to pivot around a first axis C1 extending in the second direction. In plan view, a second axis C2, which is perpendicular to the first axis C1, lies along the center of gravity of the mirror 1200. The mirror 1200 and the first elastic deformation part 1211 are configured to be in line symmetry with the first axis C1 and the second axis C2.

The pivot supports 1212 are flat members that extend in the second direction, and are provided as a pair flanking the mirror 1200, and in symmetry with the first axis C1 and the second axis C2. Both ends of the pivot supports 1212 in the second direction and both ends of the first elastic deformation part 1211 in the second direction are linked by the first actuators 1215. Four of the first actuators 1215 are provided so as to be in symmetry with the first axis C1 and the second axis C2.

The first actuators 1215 are provided with piezoelectric members, and deform when power is supplied to them. The four first actuators 1215 are driven as needed to impart a force to the first elastic deformation part 1211 in the direction in which it twists around the first axis C1. This force is transferred to the mirror 1200, and causes the mirror 1200 to rotate around the first axis C1. When the mirror 1200 rotates, the first elastic deformation part 1211 linked to the mirror 1200 is twisted elastically. This force from the first actuators 1215 and the elastic force of the first elastic deformation part 1211 cause the mirror 1200 to pivot around the first axis C1.

The second elastic deformation part 1213, which extends outward in the first direction, is linked to the center portion in the second direction of the pivot supports 1212. The frame 1214 has a rectangular opening window in its center, and the distal end portions of the second elastic deformation part 1213 are linked to the inner faces of the opening window of the frame 1214. The second actuators 1216, which extend in the second direction, are linked to the middle portion of the second elastic deformation part. The second actuators 1216 extend to opposite sides in the second direction, flanking the second elastic deformation part 1213. The second actuators 1216 are linked to the second elastic deformation part 1213 and the frame 1214. Four of the second actuators 1216 are provided so as to be in symmetry with the first axis C1 and the second axis C2.

The second actuators 1216 make use of the same piezoelectric members as the first actuators 1215, and deform when power is supplied. The four second actuators 1216 are driven as needed to impart a force to the second elastic deformation part 1213 in the direction in which it twists around the second axis C2. This force is transferred to the pivot supports 1212, and causes the pivot supports 1212 to rotate around the second axis C2. When rotating around the second axis C2, the mirror 1200, the first elastic deformation part 1211, the pivot supports 1212, and the first actuators 1215 rotate integrally.

The second elastic deformation part 1213 twists elastically when the mirror 1200, the first elastic deformation part 1211, the pivot supports 1212, and the first actuators 1215 rotate. This force from the second actuators 1216 and the elastic force of the second elastic deformation part 1213 cause the mirror 1200 to pivot around the second axis C2.

The MEMS 121 is configured as above, and can pivot the reflective face 120 of the mirror 1200 in the first and second directions. Here, an example of the MEMS 121 is described in which piezoelectric actuators are used, but a different configuration may be used instead, such as electrostatic or magnetic actuators. Also, the MEMS 121 here operates at a frequency of 24 kHz around the first axis C1 and 60 Hz around the second axis C2, but is not limited to this.

Nor is the element that drives the reflective face 120 limited to being an MEMS, and may have a configuration that allows the optical axis of the reflected light to be moved around two intersecting axes, such as a combination of galvanometer mirrors or polygon mirrors. The first direction and second direction are perpendicular, but need not be so, and only need to be intersecting. However, they are preferably perpendicular or substantially perpendicular in order for the sensing area Sa to be accurately scanned two-dimensionally with the test light.

The drive of the MEMS 121 of the first test light generator 12 is controlled by a scanning controller 412 (discussed below) of the scanning light source controller 41, and a control signal (scan signal) from the scanning controller 412 is inputted to the driver 122. The driver 122 generates a drive signal that drives the actuators of the MEMS 121 based on the control signal from the scanning controller 412, and thereby drives the actuators. The drive signal of the driver 122 causes the MEMS 121 to pivot at a specific frequency and twisting angle in the first direction H and the second direction V. Also, the signal processor 123 generates a displacement signal that includes information about the displacement (angle) of the reflective face 120 based on a sensor signal outputted from the MEMS 121, and sends this displacement signal to the scanning controller 412 of the scanning light source controller 41.

The second optical system 20 has the same configuration as the first optical system 10. That is, the second optical system 20 includes a second light source component 21 and a second test light generator 22 (e.g., scanning light generator). The second light source component 21 includes a laser light emitting element 211, a driver 212, a second lens 23, a second beam splitter 24, and a second monitor-use light receiver 25. Because the components of the second optical system 20 have the same configuration as those of the first optical system 10, portions that are substantially the same will not be described again. The first light source component 11 and the second light source component 21 may be configured to emit infrared light of the same wavelength, or to emit infrared light of different wavelengths.

The first optical system 10 and the second optical system 20 emit test light from the first light exit position 101 and the second light exit position 102, respectively. With the position sensing device A, reflected or scattered light produced when test light illuminates a sensing object (such as the user's finger Fg) located within the sensing area Sa is received by the light receiver 300. The light receiver 300 will now be described.

The light receiver 300 outputs a light reception signal upon receiving reflected infrared light in the infrared band, which is test light emitted from the first light exit position 101 and/or the second light exit position 102. The light receiver 300 includes a light receiving element 31, a filter 32, and a lens 33. The light receiver 300 is disposed so as to be opposite the side where test light from the first light exit position 101 and the second light exit position 102 is incident in the sensing area Sa. However, this is not the only option, and a wide range of positions can be employed at which reflected and/or scattered light produced when the test light emitted from the first light exit position 101 and the second light exit position 102 is reflected by a sensing object can be sensed. Disposing it in the area between the first light exit position 101 and the second light exit position 102 allows the light receiver 300 to be more compact, and also makes it easier for the scanning light source component 100 and the light receiver 300 to be contained in the same housing, so the position sensing device A can be more compact.

The light receiving element 31 is an opto-electric element that receives light of a specific wavelength band (here, a wavelength band including the infrared light emitted from the scanning light source component 100), and then emits a light reception signal (an electrical signal). The higher is the intensity of the light received by the light receiving element 31, the stronger is the signal that is emitted. With the light receiver 300, the layout is such that sensing light reflected or scattered by the user's finger Fg passes through the lens 33. When this sensing light is transmitted by the lens 33, it is converged so that it more accurately illuminates the light receiving element 31. This means that high-intensity light is incident on the light receiving element 31, and a strong light reception signal can be outputted.

The light receiver 300 includes the filter 32 on the opposite side of the lens 33 from the light receiving element 31. The filter 32 is a band pass filter that blocks light of wavelengths other than the wavelength band in which the sensing light is included. Using the filter 32 makes it less likely that ambient light will be incident on the light receiving element 31, so the light reception signal includes less noise produced by ambient light. Consequently, the light receiving element 31 can output an accurate and high-strength light reception signal.

The light receiver 300 in this embodiment has the lens 33 disposed between the filter 32 and the light receiving element 31, but this is not the only option, and the configuration may instead be such that the filter 32 is between the lens 33 and the light receiving element 31. A wide range of configurations can be employed, so long as unnecessary light, that is, light of wavelengths other than the wavelength band in which the sensing light is included, can be removed from the light that is incident on the light receiving element 31.

The processor 400 will now be described. The processor 400 controls the various parts of the scanning light source component 100, and also computes the position of the user's finger Fg within the sensing area Sa based on the light reception signal from the light receiver 300.

The processor 400 includes a CPU, an MPU, or another such arithmetic processing circuit, and as shown in FIG. 3, includes the scanning light source controller 41 (e.g., controlling unit), an arithmetic processor 42 (e.g., calculation unit), a memory 43, a synchronization signal generator 44, and an external output component 45.

The processor 400 preferably includes a microcomputer with a control program that controls the scanning light source component 100. The processor 400 can also include other conventional components such as an input interface circuit, an output interface circuit, and storage devices such as a ROM (Read Only Memory) device and a RAM (Random Access Memory) device. The microcomputer of the processor 400 is programmed to control the scanning light source component 100. The memory circuit stores processing results and control programs. The processor 400 is operatively coupled to various parts of the position sensing device A or the spatial input device Ip in a conventional manner. The internal RAM of the processor 400 can store statuses of operational flags and various control data. The internal ROM of the processor 400 can store the programs for various operations. The processor 400 is capable of selectively controlling any of the components of the position sensing device A or the spatial input device Ip in accordance with the control program. It will be apparent to those skilled in the art from this disclosure that the precise structure and algorithms for the processor 400 can be any combination of hardware and software that will carry out the functions of the present invention.

The scanning light source controller 41 is a controller that controls the output of light from the scanning light source component 100, the speed and range of movement of the test light, and so forth. The scanning light source controller 41 includes the light source controller 411 and the scanning controller 412.

The light source controller 411 is a control circuit that controls the drive of the first light source component 11 of the first optical system 10 and the second light source component 21 of the second optical system 20. The light source controller 411 receives a monitor signal from the first monitor-use light receiver 15 of the first optical system 10. The light source controller 411 generates a control signal that controls the output of the laser light emitting element 111 of the first light source component 11, the light exit timing, the light exit duration, and so forth based on the monitor signal, and sends this to the driver 112. The light source controller 411 also receives a monitor signal from the second monitor-use light receiver 25 of the second optical system 20. The light source controller 411 generates a control signal that controls the output of the laser light emitting element 211 of the second light source component 21, the light exit timing, the light exit duration, and so forth based on the monitor signal, and sends this to the driver 212.

Also, the light source controller 411 controls the first light source component 11 and the second light source component 21 so that the exit of infrared light from the laser light emitting element 111 of the first light source component 11 will not happen at the same time as the exit of infrared light from the laser light emitting element 211 of the second light source component 21. The timing of the drive will be discussed in detail below.

The scanning controller 412 is a control circuit that controls the drive of the first test light generator 12 of the first optical system 10 and the second test light generator 22 of the second optical system 20. The scanning controller 412 receives a displacement signal from the signal processor 123 of the first test light generator 12. It then generates a control signal for suitably pivoting the reflective face 120 based on this displacement signal, and sends this to the driver 122. The scanning controller 412 receives a displacement signal from a signal processor 223 of the second test light generator 22. It then generates a control signal for suitably pivoting the reflective face 220 based on this displacement signal, and sends this to a driver 222.

The light source controller 411 and the scanning controller 412 synchronously drive the first light source component 11, the first test light generator 12, the second light source component 21, and the second test light generator 22, thereby scanning the sensing area Sa two-dimensionally with test light. The scanning light source controller 41 is able to access the memory 43. The scanning light source controller 41 drives the first optical system 10 and the second optical system 20 based on optical scanning pattern information stored in the memory 43.

The memory 43 includes a storage unit such as a ROM (read-only), a RAM (writable), or a flash memory. The memory 43 is equipped with a control table in which information about the light exit timing of the first light source component 11, the pivot angle of the reflective face 120 of the first test light generator 12, the light exit timing of the second light source component 21, and the pivot angle of the reflective face 220 of the second test light generator 22 are listed in time series. This control table may also handle other data as well. Whether light exits the first light source component 11, the pivot angle of the reflective face 120 (the MEMS 121), whether light exits the second light source component 21, and the pivot angle of the reflective face 220 (the MEMS 221), all at a certain time, are optical scanning pattern information.

The arithmetic processor 42 includes a receiver 421 and an arithmetic unit 422. The receiver 421 is a circuit that receives a light reception signal from the light receiving element 31 of the light receiver 300. The receiver 421 also receives a synchronization signal from the synchronization signal generator 44. The receiver 421 associates the synchronization signal and the light reception signal from the light receiving element 31, and sends them to the arithmetic unit 422.

The arithmetic unit 422 is a circuit that computes position data (coordinate data) for the user's finger Fg within the sensing area Sa from the light reception signal and the synchronization signal. The arithmetic unit 422 accesses the memory 43 and designates the optical path of test light reflected or scattered by the user's finger Fg from the control table and the light reception signal and synchronization signal. The three-dimensional coordinates of the user's finger Fg are then calculated from the designated optical path of the test light. The method for calculating the three-dimensional coordinates will be discussed below.

The synchronization signal generator 44 includes a signal generation circuit for generating a synchronization signal. Because operation is based on a synchronization signal, the light source controller 411 and the scanning controller 412 are driven in synchronization. The synchronization signal is also sent to the arithmetic processor 42, and the duration of the exit of test light from the scanning light source component 100 and the duration of the reception of test light by the light receiver 300 can be acquired from the synchronization signal associated with the light reception signal.

The external output component 45 is connected to an external device, and includes a communication circuit for sending position information (three-dimensional coordinates) for the user's finger Fg to the external device. The external output component 45 may be configured to perform data communication over a wire, or to perform data communication wirelessly.

Figure 5A:
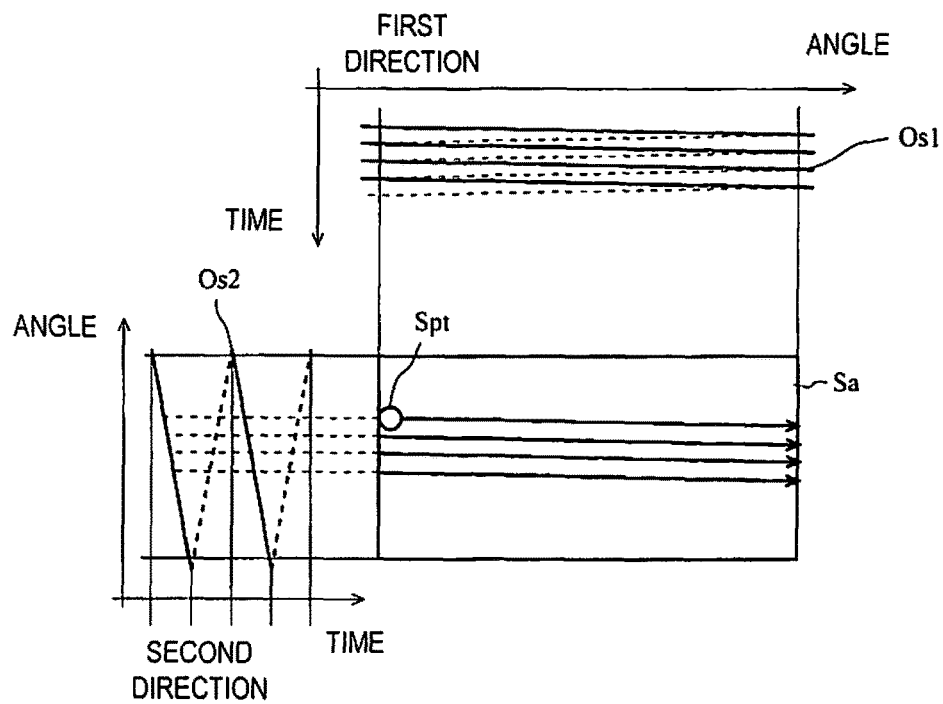
FIG. 5A is a diagram of the operation of a first test light generator of the position sensing device.
Figure 5B:
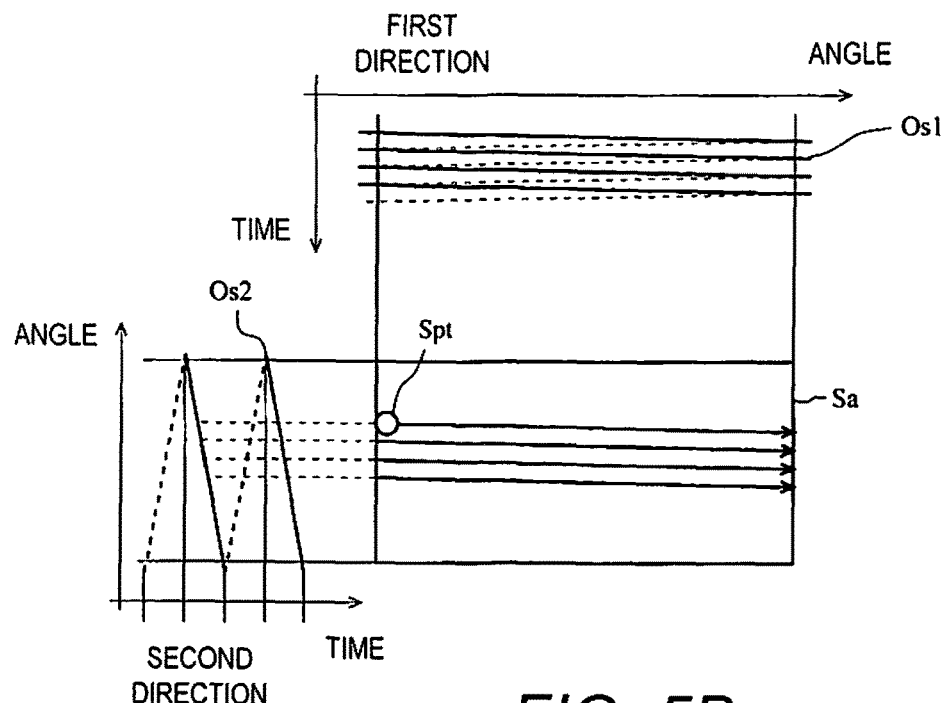
FIG. 5B is a diagram of the operation of a second test light generator of the position sensing device.

The operation of the position sensing device A will now be described through reference to the drawings. FIG. 5A is a diagram of the operation of a first test light generator of the position sensing device, and FIG. 5B is a diagram of the operation of a second test light generator of the position sensing device.

FIG. 5A shows the operation of the MEMS 121 of the first test light generator 12. The rectangle in FIG. 5A indicates the sensing area Sa. The sensing area Sa is scanned two-dimensionally with a spot Spt of test light. FIG. 5A shows the pivot of the reflective face 120 of the first test light generator 12 around the first axis C1, that is, the pivot Os1 in the first direction, and the pivot around the second axis C2, that is, the pivot Os2 in the second direction. The first and second directions in FIG. 5A correspond to the first direction (horizontal direction) and second direction (vertical direction) in FIG. 2.

In FIG. 5A, the pivot Os1 in the first direction is plotted with the pivot angle (normal line position) of the reflective face 120 on the horizontal axis and time on the vertical axis, and the pivot Os2 in the second direction is plotted with time on the horizontal axis and the pivot angle (normal line position) of the reflective face 220 on the vertical axis. With the position sensing device A, the first light source component 11, the first test light generator 12, the second light source component 21, and the second test light generator 22 are driven based on the control signals generated by the light source controller 411 and the scanning controller 412. The reflective face 120 pivots in the first direction at a constant frequency, and also pivots in the second direction at a constant frequency.

With the position sensing device A, two-dimensional scanning of the sensing area Sa is performed by shifting the movement of the spot Spt to one side in the first direction to the second direction, and repeating. When such scanning is performed, the scanning light source controller 41 performs control as follows. As shown in FIG. 5A, the scanning light source controller 41 causes the laser light emitting element 111 to emit infrared light when the angle of the reflective face 120 moves to one side in the first direction (here, from left to right). When the angle of the reflective face 120 moves to the other side in the first direction (right to left), the emission of infrared light from the laser light emitting element 111 is stopped. This period in which the emission of infrared light from the laser light emitting element 111 is stopped is the first direction return period (horizontal return period). In FIG. 5A, the return period of the pivot Os1 in the first direction is indicated by a broken line. In this embodiment, the laser light emitting element 111 emits light only when the spot Spt scans to one side in the first direction, but this is not the only option. The laser light emitting element 111 may emit light so that the spot Spt goes back and forth in the first direction.

The reflective face 120 also pivots in the second direction, at a lower frequency than the frequency of the pivot in the first direction. With the position sensing device A, the scanning light source controller 41 controls the emission of infrared light from the laser light emitting element 111 during movement to one side in the first direction (left to right) while the angle of the reflective face 120 moves to one side in the second direction (here, top to bottom). Therefore, the spot Spt of test light that actually illuminates the sensing area Sa moves in both the first and second directions, that is, it moves at an angle.

The scanning light source controller 41 adjusts the frequency of the first and second directions so that the angle of the reflective face 120 will move by a width that is equal to or slightly less than the diameter of the spot Spt of test light in the second direction during one round trip in the first direction (equal to one line). Consequently, movement of the spot Spt of test light to one side in the first direction is repeated while being shifted one line at a time in the second direction, and the sensing area Sa is evenly scanned with the spot Spt of test light. Movement of the spot Spt is called scanning, and movement in the first direction will sometimes be called first direction scanning, and movement in the second direction called second direction scanning.

When the angle of the reflective face 120 moves to the other side in the second direction (bottom to top), the emission of infrared light from the laser light emitting element 111 is stopped. This period in which the angle of the reflective face 120 moves to the other side in the second direction is the second direction return period (vertical return period). In FIG. 5A, the return period of the pivot Os1 in the first direction is indicated by a broken line.

The scanning light source controller 41 controls the first optical system 10 of the scanning light source component 100 as discussed above, so that scanning is repeatedly carried out in which the spot Spt of test light emitted from the first light exit position 101 moves from the left to the right and from the top to the bottom one line at a time.

Also, as shown in FIG. 5B, the second optical system 20 operates the same as the first optical system 10, and two-dimensional scanning of the sensing area Sa with the spot Spt of test light is done in the same way with the test light from the second optical system 20.

Figure 6:
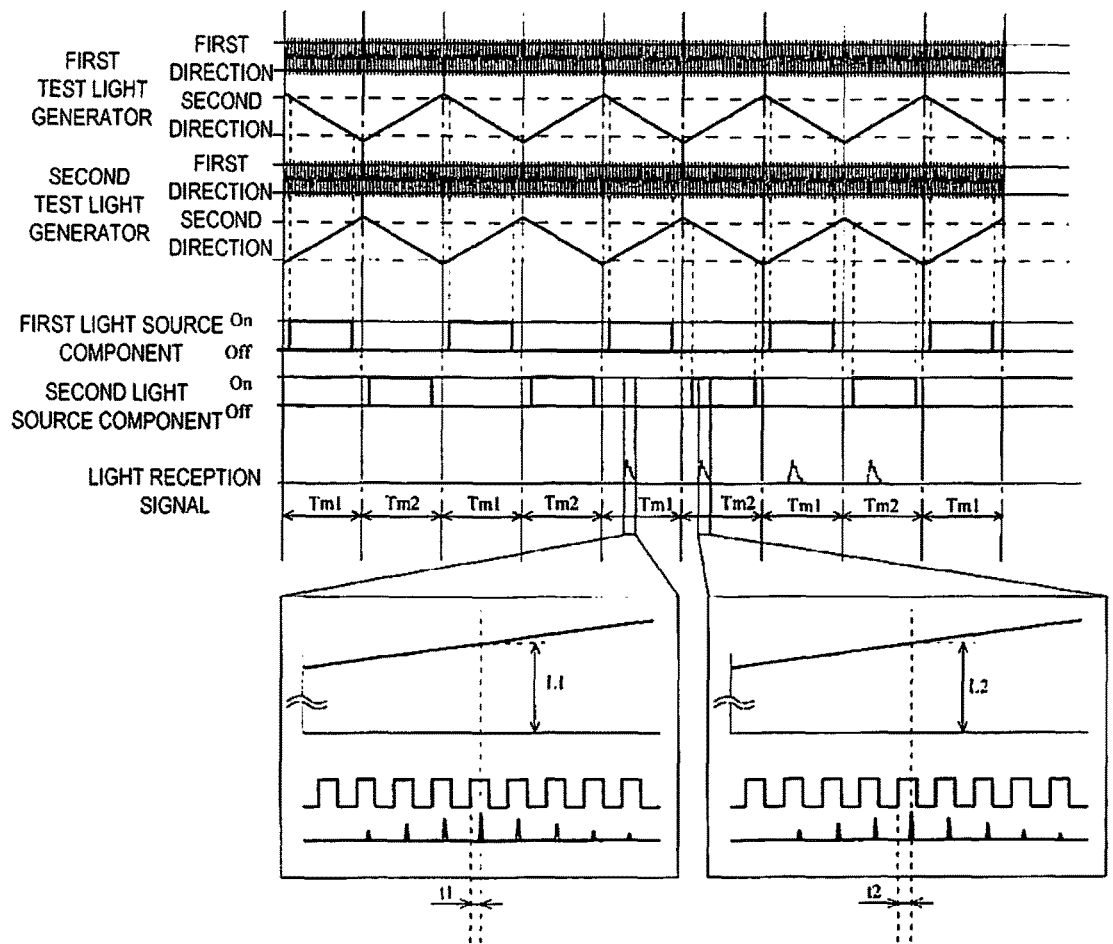
FIG. 6 is a timing chart of the operation of the scanning light source component.

With the position sensing device A, the scanning light source controller 41 controls the scanning light source component 100 so that test light from the first light exit position 101 and test light from the second light exit position 102 will not be emitted in the sensing area Sa at the same time. The control over the scanning light source component 100 by the scanning light source controller 41 will now be described through reference to the drawings. FIG. 6 is a timing chart of the operation of the scanning light source component.

In FIG. 6, the horizontal axis is time, and the uppermost level shows the pivot angle of the reflective face 120 of the first test light generator 12 in the first and second directions. The level below this shows the pivot angle of the reflective face 220 of the second test light generator 22 in the first and second directions. The level below this shows the emission of infrared light from the laser light emitting element 111 of the first light source component 11. The level below this shows the emission of infrared light from the laser light emitting element 211 of the second light source component 21. The lowermost level is the light reception signal from the light receiving element 31 of the light receiver 300. Also shown is a detail view of the portion received by the light receiving element 31.

As shown in FIG. 6, the arithmetic unit 422 pivots the reflective face 120 (the MEMS 121) so that the reflected light (test light) exceeds the illumination range in the first direction. The light source controller 411 then controls the timing at which light is emitted from the first light source component 11, so that the test light illuminates within the illumination range of the sensing area Sa.

The arithmetic unit 422 then pivots the reflective face 120 so that the reflected light (test light) exceeds the illumination range in the second direction. The light source controller 411 then controls the timing at which light is emitted from the first light source component 11, so that the test light illuminates within the illumination range of the sensing area Sa. In the first optical system 10, the period in which the line indicating movement of the reflective face 120 in the first direction is rising to the right (period Tm2) is the return period (vertical return period), and infrared light is emitted from the laser light emitting element 111 in the scanning period, which is the period in which the line is falling to the right (period Tm1). More precisely, with the first optical system 10, in the period Tm1, when the reflective face 120 moves to one side in the first direction (left to right), infrared light is emitted from the laser light emitting element 111 of the first light source component 11.

The scanning light source controller 41 controls the scanning light source component 100 so that the first test light generator 12 of the first optical system 10 and the second test light generator 22 of the second optical system 20 will alternately suppress the return period in the second direction. As shown in FIG. 5, in the period Tm1 the second test light generator 22 is in the return period (vertical return period), and in the period Tm2 the first test light generator 12 is in the return period (vertical return period). With the position sensing device A, in the period Tm1 the sensing area Sa is scanned two-dimensionally with test light from the first light exit position 101, and in the period Tm2 the sensing area Sa is scanned two-dimensionally with test light from the second light exit position 102. Consequently, test light from the first light exit position 101 and test light from the second light exit position 102 will not illuminate the sensing area Sa at the same time.

Figure 7A:
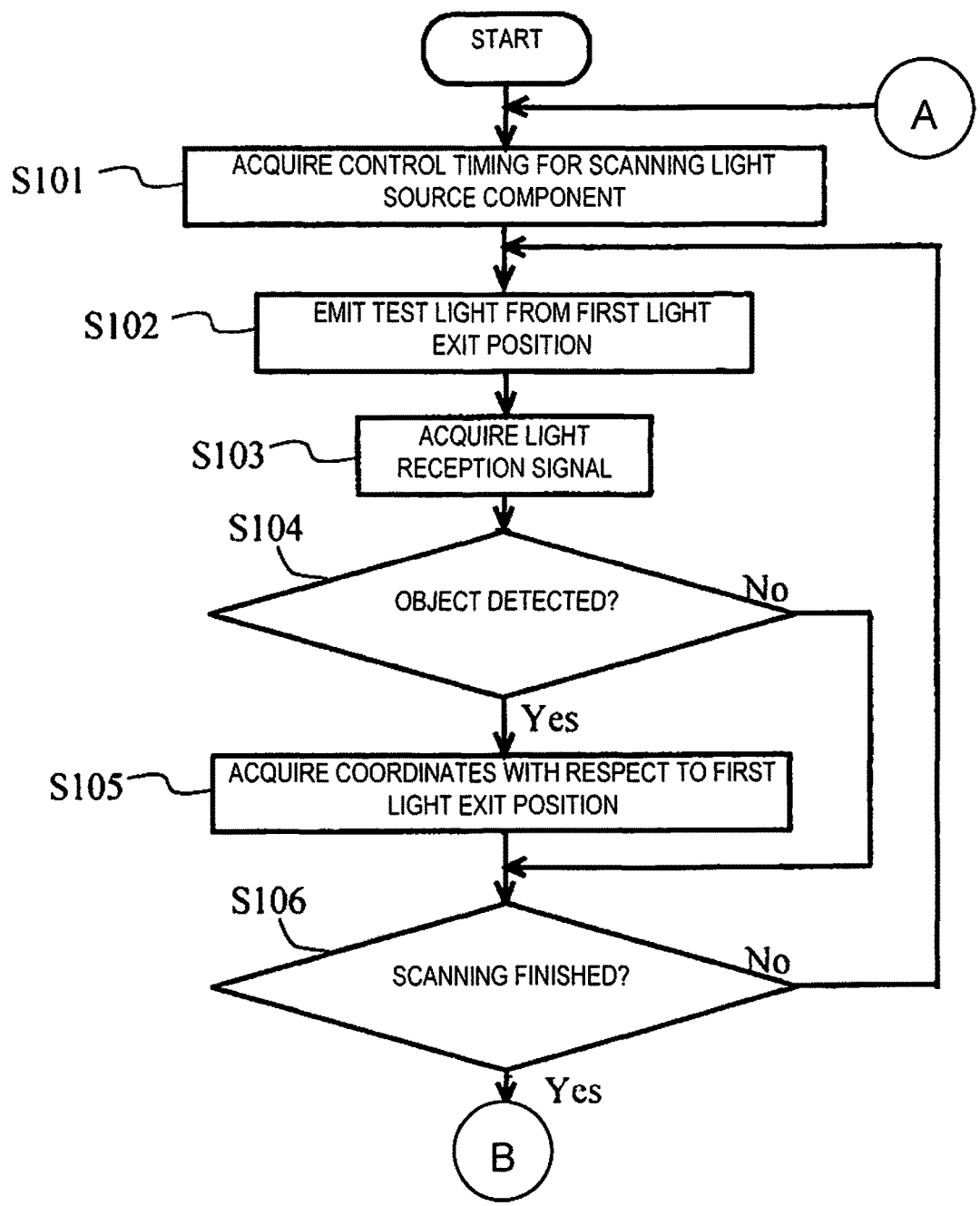
FIG. 7A is a first part of a flowchart of the operation of the position sensing device.
Figure 7B:
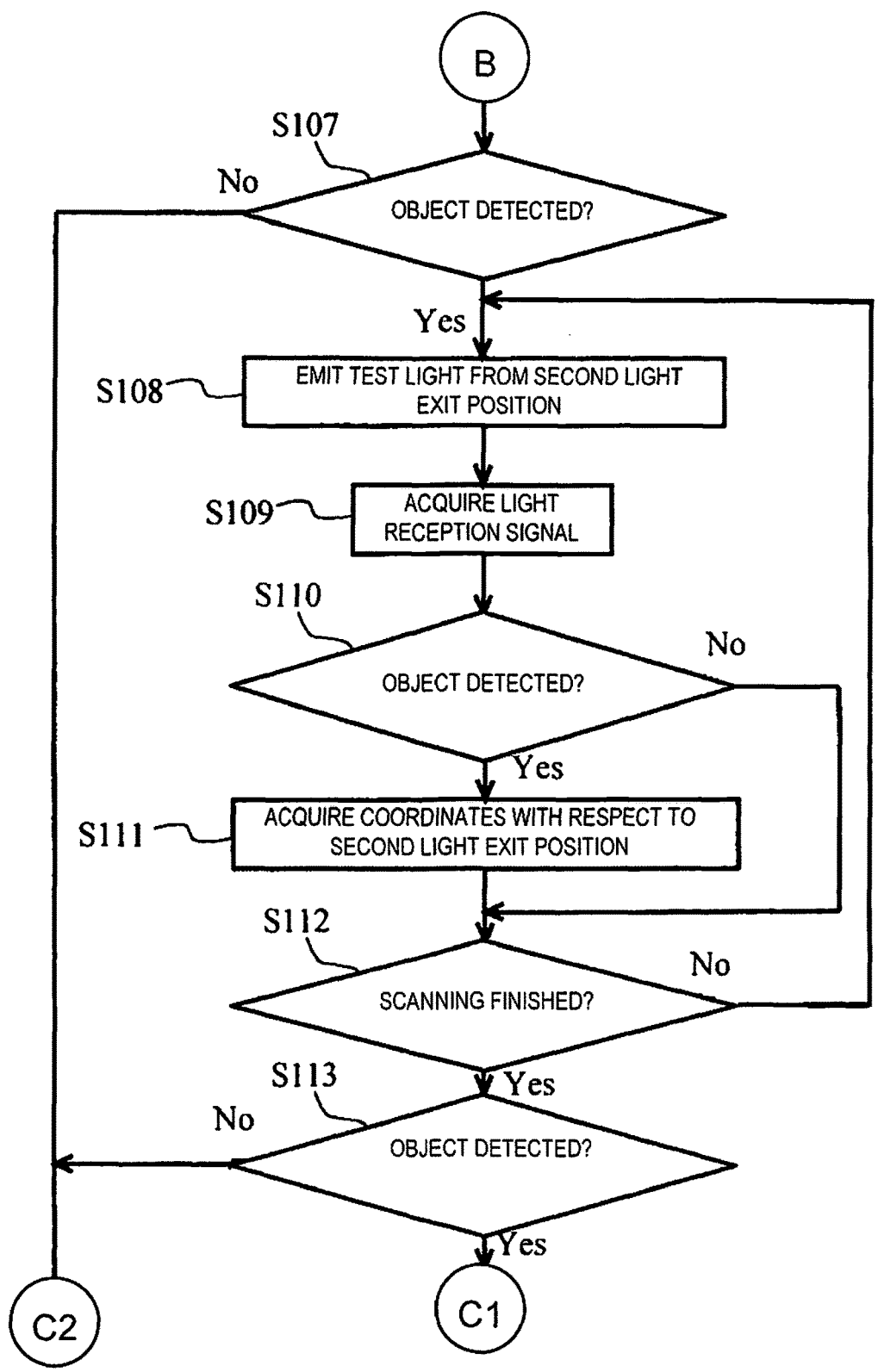
FIG. 7B is a second part of the flowchart of the operation of the position sensing device.
Figure 7C:
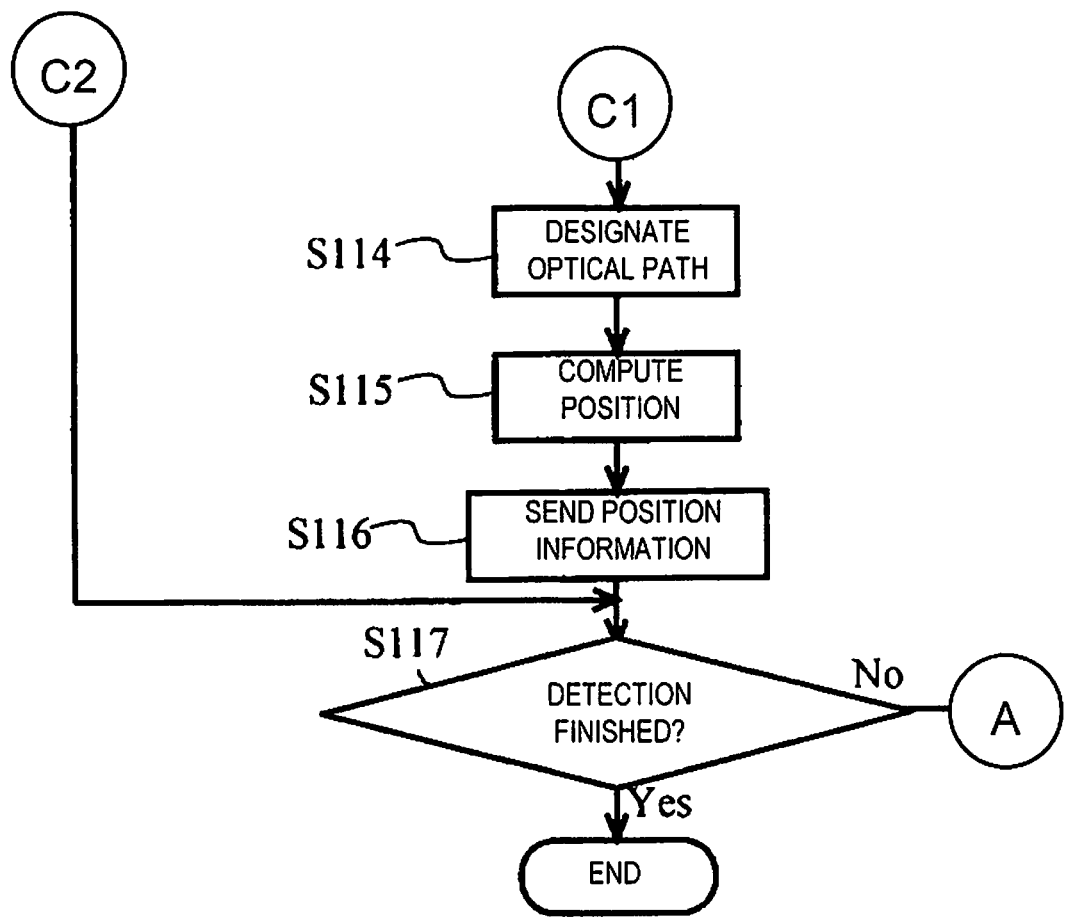
FIG. 7C is a third part of the flowchart of the operation of the position sensing device.
Figure 8A:
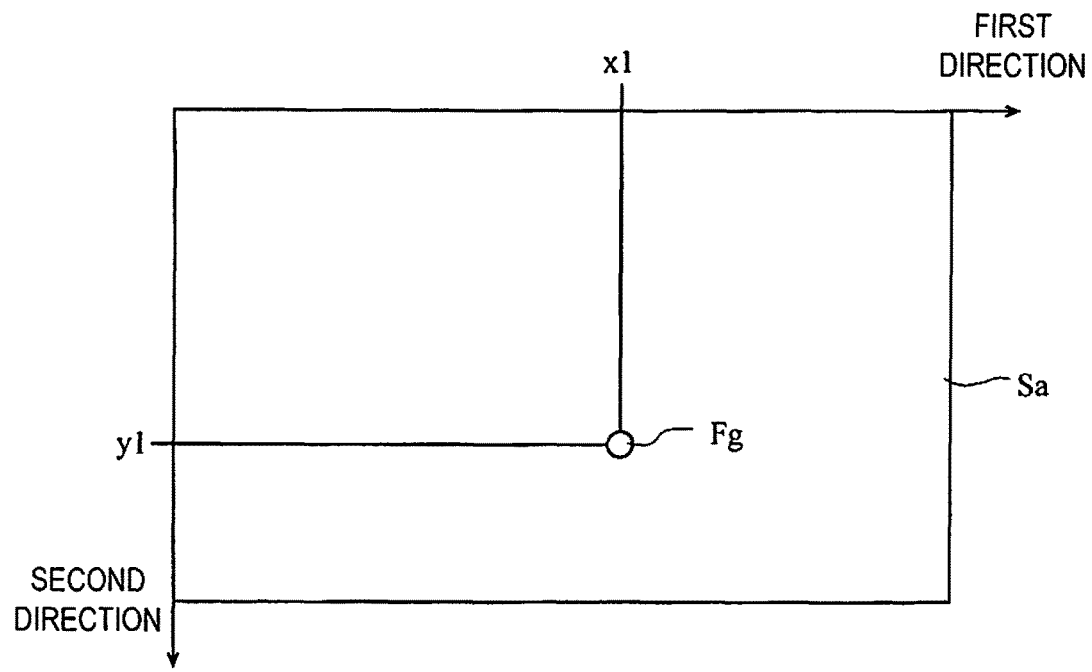
FIG. 8A is a diagram of the position where test light emitted from a first light exit position that has been reflected or scattered by a sensing object is received.
Figure 8B:
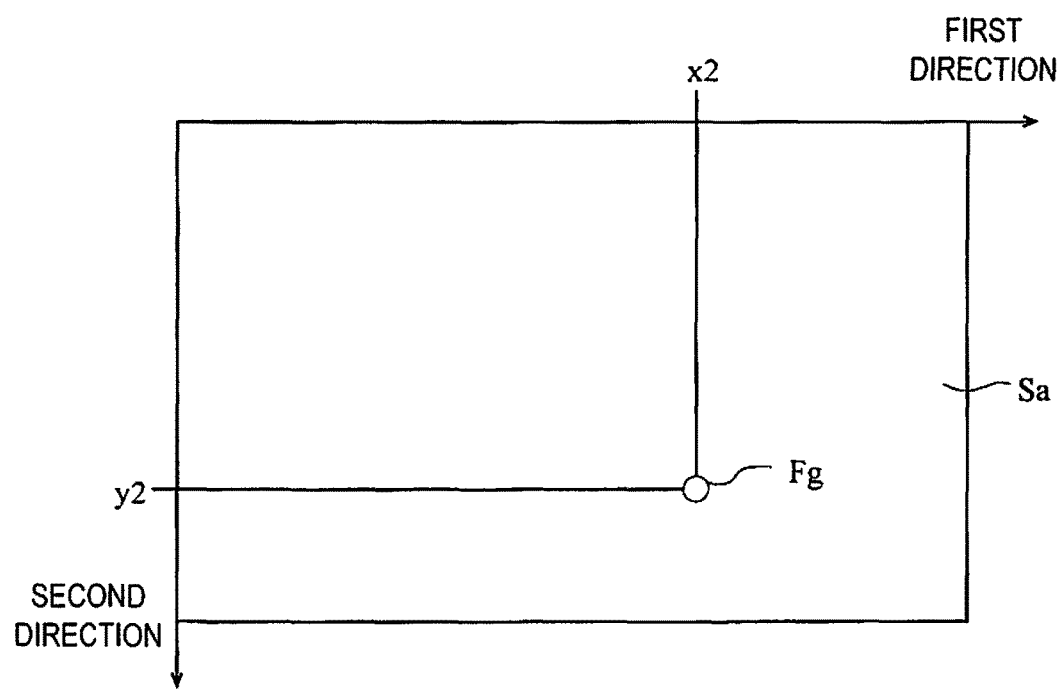
FIG. 8B is a diagram of the position where test light emitted from a second light exit position that has been reflected or scattered by a sensing object is received.
Figures 9A, 9B:
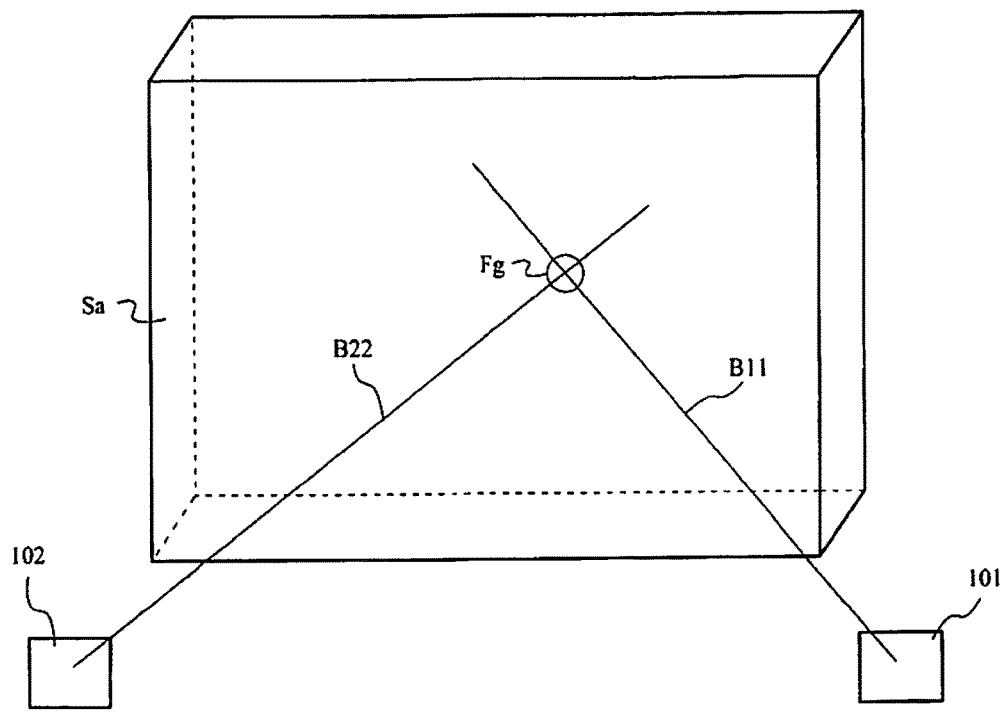
FIG. 9A illustrates tables in which coordinates are associated with the optical path of test light.
FIG. 9B is a diagram showing that three-dimensional coordinates are computed from information about the optical path.

The procedure for sensing a sensing object (the user's finger Fg) with the position sensing device A will now be described through reference to the drawings. FIG. 7A is a first part of a flowchart of the operation of the position sensing device. FIG. 7B is a second part of the flowchart of the operation of the position sensing device. FIG. 7C is a third part of the flowchart of the operation of the position sensing device. FIG. 8A is a diagram of the position where test light emitted from the first light exit position that has been reflected or scattered by a sensing object is received. FIG. 8B is a diagram of the position where test light emitted from a second light exit position that has been reflected or scattered by a sensing object is received. FIG. 9A illustrates tables in which coordinates are associated with the optical path of test light. FIG. 9B is a diagram showing that three-dimensional coordinates are computed from information about the optical path.

As shown in FIG. 7A, the scanning light source controller 41 acquires information about the timing of the drive of the first optical system 10 and the second optical system 20 from the control tables of the memory 43 (step S101). The scanning controller 412 of the scanning light source controller 41 generates a scanning signal (control signal) indicating the pivot timing of the MEMS 121 of the first test light generator 12 in the first and second directions based on information about drive timing and the synchronization signal from the synchronization signal generator 44, and sends this to the driver 122. The light source controller 411 sends an emission signal (control signal) to the driver 112 so that the laser light emitting element 111 of the first light source component 11 will emit light when the MEMS 121 pivots so as to produce a certain illumination angle for the test light. Thus, test light is emitted from the first light exit position 101 when a control signal is sent to the first optical system 10 (step S102).

The light receiving element 31 of the light receiver 300 sends reception signals to the processor 400 at regular intervals, and the receiver 421 of the arithmetic processor 42 acquires a light reception signal from the light receiving element 31 (step S103). The arithmetic processor 42 determines whether or not the user's finger Fg has been detected (step S104). The arithmetic processor 42 determines that the user's finger Fg has been detected when the light reception signal that is at or above a predetermined threshold is acquired. When the arithmetic processor 42 determines that the user's finger Fg has been detected (Yes in step S104), then the receiver 421 receives a synchronization signal from the synchronization signal generator 44, associates the light reception signal with the synchronization signal, and sends them to the arithmetic unit 422. The arithmetic unit 422 stores reception information included in the light reception signal and the synchronization signal in the memory 43, and acquires coordinates of the user's finger Fg with respect to the first light exit position 101 based on the timing of the acquisition of the light reception signal and the synchronization signal (step S105). When the arithmetic processor 42 determines that the user's finger Fg has not been detected (No in step S104), the process proceeds to step S106.

The scanning light source controller 41 checks whether or not the scanning is finished (step S106). Whether the scanning has ended is determined by whether or not the reflective face 120 (MEMS 121) is in the return period, based on a displacement signal from the signal processor 123 of the first test light generator 12.

If scanning has not ended (No in step S106), the emission of test light from the first light exit position 101 is continued (return to step S102). If scanning has ended (Yes in step S106), then the arithmetic processor 42 checks whether or not the user's finger Fg has been detected in the sensing area Sa in step S104 (step S107 in FIG. 7B).

As mentioned above, in step S104, an example of checking whether or not the user's finger Fg is in the sensing area Sa is to determine whether or not the light receiving element 31 is at or above a predetermined threshold, but this is not the only option.

Also, as mentioned above, in step S105, if the user's finger Fg has been detected in the sensing area Sa (Yes in step S104), then the arithmetic unit 422 calls up light reception information, acquires detection information (coordinates) for the user's finger Fg with respect to the first light exit position 101, and stores this information in the memory 43 (step S105).

The acquisition by the arithmetic unit 422 of the coordinates of the detection position with respect to the first light exit position 101 involves acquiring the synchronization signal associated with the light reception signal. A time t1 since the start of light exit from the laser light emitting element 111 of the first light source component 11 (see the detail portion of FIG. 6) is acquired based on the synchronization signal and the control table. The laser light emitting element 111 emits light in synchronization with the pivoting of the reflective face 120, so a position x1 of the user's finger Fg in the first direction with respect to the first light exit position 101 can be confirmed by acquiring the time t1 since the start of emission from the laser light emitting element 111.

Similarly, the arithmetic unit 422 acquires a pivot angle L1 in the second direction of the reflective face 120 (see the detail portion of FIG. 6) based on a displacement signal from the signal processor 123 of the first test light generator 12. A position y1 of the user's finger Fg in the second direction with respect to the first light exit position 101 can be confirmed from this pivot angle L1 in the second direction. Because of this, the coordinates (x1, y1) of the user's finger Fg within the sensing area Sa as seen from the first light exit position 101 can be acquired (see FIG. 8A).

If the user's finger Fg is not detected in the sensing area Sa by the test light from the first light exit position 101 (No in step S107), the position sensing device A confirms whether or not detection of the user's finger Fg within the sensing area Sa has ended (step S117 in FIG. 7C). Examples of the end of detection is when an end signal is received from an external device, and when it is detected that the user has operated a control component (such as a switch; not shown in the drawings), but these are just examples.

If the processor 400 confirms that the detection of the user's finger Fg within the sensing area Sa is to be ended (Yes in step S117 in FIG. 7C), then the detection of the user's finger Fg within the sensing area Sa is ended. If the processor 400 confirms that the detection in the sensing area Sa is to be continued (No in step S117 in FIG. 7C), then detection of the user's finger Fg within the sensing area Sa is performed with the test light from the first light exit position 101 (return to step S101 in FIG. 7A). As discussed above, if the user's finger Fg is not detected with the test light from the first light exit position 101, emission of the test light from the first light exit position 101 is repeated. Therefore, the emission of test light from the second light exit position 102 is stopped, and this reduces power consumption. Also, because the first light exit position 101 is disposed at a position where the test light will illuminate the sensing area Sa at an angle at which it does not shine directly at the user, safety is enhanced in the event of a malfunction, etc.

If the user's finger Fg is detected by scanning the sensing area Sa with the test light from the first light exit position 101 (Yes in step S107 in FIG. 7B), the scanning light source controller 41 causes the second light exit position 102 to emit test light (step S108). More specifically, the following happens. The scanning controller 412 generates a scanning signal (control signal) indicating the timing at which the MEMS 221 of the second test light generator 22 pivots in the first direction or the second direction based on information about the drive timing and the synchronization signal from the synchronization signal generator 44, and sends this signal to the driver 222. The light source controller 411 sends a light emission signal (control signal) to the driver 212 so that the laser light emitting element 211 of the second light source component 21 will emit light when the MEMS 221 pivots so as to produce a certain illumination angle for the test light.

The light receiving element 31 of the light receiver 300 sends reception signals to the processor 400 at regular intervals, and the receiver 421 of the arithmetic processor 42 acquires a light reception signal from the light receiving element 31 (step S109). As discussed above, it can be confirmed from the synchronization signal whether light with which the light reception signal is received is being emitted from the first light exit position 101 or from the second light exit position 102.

The arithmetic processor 42 determines whether or not the user's finger Fg has been detected (step S110). The arithmetic processor 42 determines that the user's finger Fg has been detected when the light reception signal that is at or above a predetermined threshold is acquired. When the arithmetic processor 42 determines that the user's finger Fg has been detected (Yes in step S110), then the receiver 421 receives a synchronization signal from the synchronization signal generator 44, associates the light reception signal with the synchronization signal, and sends them to the arithmetic unit 422. The arithmetic unit 422 stores reception information included in the light reception signal and the synchronization signal in the memory 43, and acquires coordinates of the user's finger Fg with respect to the second light exit position 102 based on the timing of the acquisition of the light reception signal and the synchronization signal (step S111). When the arithmetic processor 42 determines that the user's finger Fg has not been detected (No in step S110), the process proceeds to step S112.

The scanning light source controller 41 then confirms whether or not the scanning has ended (step S112). The end of the scanning is determined by ascertaining whether or not the reflective face 220 (MEMS 221) is in its return period based on a displacement signal from the signal processor 223 of the second test light generator 22.

If scanning has not ended (No in step S112), the emission of test light from the second light exit position 102 is continued (return to step S108). If scanning has ended (Yes in step S112), the arithmetic processor 42 confirms whether or not the user's finger Fg was detected in the sensing area Sa in step S110 (step S113).

As mentioned above, in step S110, confirmation of whether or not the user's finger Fg is in the sensing area Sa is the same as discussed above. An example of confirming whether or not the user's finger Fg is in the sensing area Sa is to determine whether or not the light receiving element 31 is at or above a predetermined threshold, but this is not the only option.

Also, as mentioned above, in step S111, if the user's finger Fg has been detected in the sensing area Sa (Yes in step S110), then the arithmetic unit 422 calls up light reception information, acquires information (coordinates) about the detection position of the user's finger Fg with respect to the second light exit position 102, and stores this information in the memory 43 (step S111).

The acquisition by the arithmetic unit 422 of the coordinates of the detection position with respect to the second light exit position 102 involves acquiring the synchronization signal associated with the light reception signal. A time t2 since the start of light exit from the laser light emitting element 211 of the second light source component 21 (see the detail portion of FIG. 6) is acquired based on the synchronization signal and the control table. The laser light emitting element 211 emits light in synchronization with the pivoting of the reflective face 220, so a position x2 of the user's finger Fg in the first direction with respect to the second light exit position 102 can be confirmed by acquiring the time t2 since the start of emission from the laser light emitting element 211.

Similarly, the arithmetic unit 422 acquires a pivot angle L2 in the second direction of the reflective face 220 (see the detail portion of FIG. 6) based on a displacement signal from the signal processor 223 of the second test light generator 22. A position y2 of the user's finger Fg in the second direction with respect to the second light exit position 102 can be confirmed from this pivot angle L2 in the second direction. Because of this, the coordinates (x2, y2) of the user's finger Fg within the sensing area Sa as seen from the second light exit position 102 can be acquired (see FIG. 8B).

If the user's finger Fg is not detected in the sensing area Sa by the test light from the second light exit position 102 (No in step S113), the position sensing device A confirms whether or not detection of the user's finger Fg within the sensing area Sa has ended (step S117 in FIG. 7C). The operation from step S117 on is the same, and therefore will not be described again.

The arithmetic unit 422 designates the optical path of the test light emitted from the first light exit position 101 and the second light exit position 102 from the coordinates of the user's finger Fg as seen from the first light exit position 101 and from the coordinates of the user's finger Fg as seen from the second light exit position 102, both of which are stored in the memory 43 (step S114 in FIG. 7C). The following is an example of the method for designating the test light. The arithmetic unit 422 designates the optical path of the test light based on coordinate information for the detected user's finger Fg with respect to the first light exit position 101, and coordinate information with respect to the second light exit position 102.

With the position sensing device A, since the sensing area Sa is scanned in the first and second directions with test light from the first light exit position 101 and the second light exit position 102, the optical path of test light can be designated from the coordinates for the user's finger Fg with respect to the first light exit position 101 and the second light exit position 102. As shown in FIG. 9A, the arithmetic unit 422 refers to an optical path table that associates the optical path of the test light, and acquires information about an optical path B11 of test light that illuminates the user's finger Fg from the first light exit position 101, and about an optical path B22 of test light that illuminates the user's finger Fg from the second light exit position 102.

As shown in FIG. 9B, three-dimensional coordinates of the user's finger Fg are acquired based on the optical path intersections. If the optical paths do not intersect, approximation computation is performed, such as using the middle point between nearest points. Also, the angles of the reflective face 120 and the reflective face 220 may be acquired from the synchronization signal associated with the light reception signal and the control table, and the optical path of the test light may be designated from these angles of the reflective face 120 and the reflective face 220.

The three-dimensional coordinates of the user's finger Fg within the sensing area Sa are then computed from the optical path of test light from the first light exit position 101 and the optical path of test light from the second light exit position 102 (step S115). The arithmetic unit 422 transfers the computed three-dimensional coordinates of the user's finger Fg to the external output component 45, and the external output component 45 sends the three-dimensional coordinates of the user's finger Fg to an external device (step S116). After the three-dimensional coordinates have been sent, it is confirmed whether or not to continue detection in the sensing area Sa (step S117). The operation from step S117 on is the same, and therefore will not be described again.

As discussed above, with the position sensing device A in this embodiment, the light receiver 300 senses light that has been reflected and/or scattered by a sensing object, originating in test light emitted in a sensing area Sa from both the first light exit position 101 and the second light exit position 102, which are disposed apart from each other in different positions. The optical path of test light emitted from the first light exit position 101 and the optical path of test light emitted from the second light exit position 102 are then designated based on reflected and/or scattered light sensed by the light receiver 300, and the three-dimensional coordinates of the sensing object are computed. Because of this configuration, the light receiver 300 need only receive light reflected and/or scattered by the sensing object, originating in the test light emitted from the first light exit position 101 and the test light emitted from the second light exit position 102, so there is greater latitude in the position of the light receiver 300. This makes it possible to improve the sensing accuracy of the position sensing device A.

Also, the light receiver 300 need only sense reflected light or scattered light, so the configuration can be simple.

Also, the user's finger Fg is used as an example of a sensing object in this embodiment, but this is not the only option, and anything having a surface that can reflect test light can be used. The same applies to the sensing objects in the following embodiments.

In the illustrated embodiment, the position sensing device A includes the light receiver 300 (e.g., at least one light receiver), and the processor 400. In the illustrated embodiment, the position sensing device A also includes the scanning light source component 100. The scanning light source component 100 is configured to emit the test lights (e.g., lights or scanning lights) from the first and second light exit positions 101 and 102 (e.g., a plurality of different light exit positions), respectively, to scan the sensing area Sa (e.g., predetermined area) with the test lights. The light receiver 300 is configured to receive the reflected infrared lights or the test lights that are emitted from the first and second light exit positions 101 and 102 and are reflected by the user's finger Fg (e.g., sensing object) within the sensing area Sa. The processor 400 is configured to control the scanning light source component 100, and is configured to sense or calculate the position of the user's finger Fg based on the light reception signal of the light receiver 300. The processor 400 is further configured to determine from which of the test lights the light reception signal is obtained, and is configured to sense or calculate the position of the user's finger Fg based on the optical paths of the test lights.

In the illustrated embodiment, with the position sensing device A as mentioned above, the scanning light source component 100 includes the first and second light source components 11 and 21 (e.g., at least one light source) that are configured to emit the lights (infrared light, laser light, and so forth), and the first and second test light generators 12 and 22 (e.g., at least one scanning light generator) that are configured to move the optical paths of the lights from the first and second light source components 11 and 21 in the first direction (or horizontal direction H) and in the second direction (or vertical direction V) that intersects the first direction. The processor 400 is configured to control the first and second light source components 11 and 21 and the first and second test light generators 12 and 22.

In the illustrated embodiment, with the position sensing device A as mentioned above, the scanning light source component 100 includes the same number of (two) light sources (first and second light source components 11 and 21) and (two) scanning light generators (first and second test light generators 12 and 22) as the first and second light exit positions 101 and 102, as illustrated in FIG. 2.

In the illustrated embodiment, with the position sensing device A as mentioned above, while the test light is being emitted from one of the first and second light exit positions 101 and 102, the processor 400 is configured to stop emission of the test light from the other one of the first and second light exit positions 101 and 102, and is configured to acquire the reception information and the synchronization signal (e.g., time information) about when the light receiver 300 has received the reflection of the test light.

In the illustrated embodiment, with the position sensing device A as mentioned above, after scanning the sensing area Sa entirely with the test light from one of the first and second light exit positions 101 and 102, the processor 400 is configured to start scanning the sensing area Sa with the test light from the other one of the first and second light exit positions 101 and 102, as illustrated in FIG. 6.

In the illustrated embodiment, with the position sensing device A as mentioned above, the processor 400 is configured to sense or calculate the position of the user's finger Fg based on a table indicative of relationship between coordinate and the optical paths B11 and B22 of the test lights, as illustrated in FIG. 9A.

In the illustrated embodiment, with the position sensing device A as mentioned above, the light receiver 300 is configured to detect the user's finger Fg based on a predetermined threshold. More specifically, the processor 400 can determine that the user's finger Fg is detected in the sensing area Sa when the magnitude of the light reception signal detected by the light receiver 300 is at or above the predetermined threshold.

In the illustrated embodiment, with the position sensing device A as mentioned above, the test light from one of the first and second light exit positions 101 and 102 (the first light exit position 101 in FIG. 7A) is repeatedly emitted (S102) without emitting the test light from the other one of the first and second light exit positions 101 and 102 (the second light exit position 102 in FIG. 7A) while the light receiver 300 does not receive the test light from the one of the first and second light exit positions 101 and 102 that is reflected by the user's finger Fg within the sensing area Sa (No in S107 in FIG. 7B), as illustrated in FIGS. 7A, 7B, 7C. More specifically, if it is determined that the user's finger Fg has not been detected with the test light from the first light exit position 101 (No in step S107 in FIG. 7B), then the process repeatedly goes back to step S102 in FIG. 7A, and the emission of the test light from the first light exit position 101 is repeated while the emission of the test light from the second light exit position 102 is stopped.

In the illustrated embodiment, with the position sensing device A as mentioned above, the processor 400 is configured to sense or calculate the position of the user's finger Fg as an intersection of the optical paths B11 and B22 of the test light, as illustrated in FIG. 9B.

In the illustrated embodiment, the spatial input device Ip includes the position sensing device A as mentioned above, and the spatial imaging plate Pt (e.g., image formation component) configured to form an image in the sensing area Sa, as illustrated in FIG. 1.

In the illustrated embodiment, the position sensing method includes receiving the reflected infrared lights or the test lights that are emitted from the first and second light exit positions 101 and 102 of the scanning light source component 100 to scan the sensing area Sa and are reflected by the user's finger Fg within the sensing area Sa, controlling the scanning light source component 100, and sensing the position of the user's finger Fg based on the light reception signal in response to the receiving of the reflected infrared lights or the test lights. The sensing of the position further including determining from which of the test lights the light reception signal is obtained, and sensing the position of the user's finger Fg based on the optical paths of the test lights.

In the illustrated embodiment, with the position sensing method as mentioned above, the controlling of the scanning light source component 100 includes controlling the first and second light source components 11 and 21 (e.g., at least one light source) that are configured to emit the lights (infrared light, laser light, and so forth), and the first and second test light generators 12 and 22 (e.g., at least one scanning light generator) that are configured to move the optical paths of the lights from the first and second light source components 11 and 21 in the first direction (or horizontal direction H) and in the second direction (or vertical direction V) that intersects the first direction.

In the illustrated embodiment, with the position sensing method as mentioned above, the controlling of the scanning light source component 100 includes stopping emission of the test light from one of the first and second light exit positions 101 and 102 while the test light is being emitted from the other one of the first and second light exit positions 101 and 102. The sensing of the position includes acquiring the reception information and the synchronization signal (e.g., time information) about when the light receiver 300 has received the reflection of the test light.

In the illustrated embodiment, the processor 400 includes the scanning light source controller 41 (e.g., controlling unit), and the arithmetic processor 42 (e.g., calculation unit), as illustrated in FIG. 3. The scanning light source controller 41 is configured to control emission of the test lights (e.g., scanning lights) from the first and second light exit positions 101 and 102 (e.g., a plurality of different light exit positions), respectively, to scan the sensing area Sa with the test lights. The arithmetic processor 42 is configured to calculate position of the user's finger Fg (e.g., sensing object) based on the light reception signal obtained in response to the test lights being reflected by the user's finger Fg. The arithmetic processor 42 is further configured to determine from which of the test lights the light reception signal is obtained, and is configured to calculate the position of the user's finger Fg based on the optical paths of the test lights.

In the illustrated embodiment, there is provided the position sensing device A with which members can be laid out with greater freedom, and the position of the user's finger Fg (e.g., sensing object) in the sensing area Sa can be sensed accurately. With the position sensing device A, the sensing area Sa is scanned with the test lights emitted from the plurality of different light exit positions 101 and 102, the sensing light that is reflected or scattered by the sensing object Fg within the sensing area Sa is received, the position of the sensing object Fg is calculated, and the processor 400 determines from which light exit position the light reception signal is obtained by receiving the sensing light based on the test light that is emitted.

Second Embodiment

Figure 10:
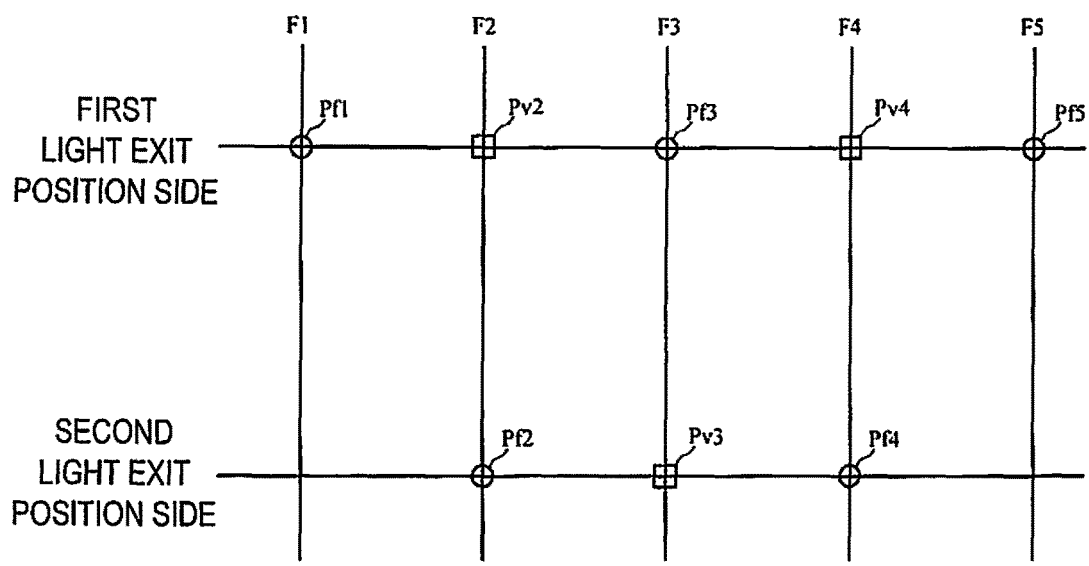
FIG. 10 is a diagram of the coordinates when a sensing object is moving in accordance with a second embodiment.

The user's finger Fg (the sensing object) will sometimes move. This scenario will now be described through reference to the drawings. FIG. 10 is a diagram of the coordinates when the sensing object is moving. The horizontal axis in FIG. 10 is the frames, the upper row is the sensing coordinates for a sensing object with respect to the first light exit position 101, and the lower row is the sensing coordinates for a sensing object with respect to the second light exit position 102. The position sensing device A alternately performs overall scanning of the sensing area Sa with test light from the first light exit position 101 and overall scanning of the sensing area Sa with test light from the second light exit position 102. Those components that are substantially the same as the components described above will be numbered the same and not described in detail again.

As shown in FIG. 10, in frames F1, F3, and F5, the arithmetic unit 422 acquires measured coordinates Pf1, Pf3, and Pf5 for the position of the user's finger Fg with respect to the first light exit position 101 when two-dimensional scanning is performed with test light from the first light exit position 101. In frames F2 and F4, the arithmetic unit 422 acquires measured coordinates Pf2 and Pf4 for the position of the user's finger Fg with respect to the second light exit position 102 when two-dimensional scanning is performed with test light from the second light exit position 102.

Also, the arithmetic unit 422 computes surmised coordinates Pv2 of the frame F2, which are surmised from the measured coordinates Pf1 of the frame F1 and the measured coordinates Pf3 of the frame F3. The computation of the surmised coordinates Pv2 is the middle point between the measured coordinates Pf1 and the measured coordinates Pf3. Surmised coordinates Pv4, which are surmised from the measured coordinates Pf3 of the frame F3 and the measured coordinates Pf5 of the frame F5, are similarly computed. Furthermore, the arithmetic unit 422 computes surmised coordinates Pv3 of the frame F3, which are surmised from the measured coordinates Pf2 of the frame F2 and the measured coordinates Pf4 of the frame F4.

The arithmetic unit 422 then computes the three-dimensional coordinates of the user's finger Fg in each frame from the measured coordinates and the surmised coordinates. For example, the three-dimensional coordinates of the user's finger Fg in the frame F2 are acquired from the surmised coordinates Pv2 of the user's finger Fg in the frame F2 with respect to the first light exit position 101, and the measured coordinates Pf2 with respect to the second light exit position 102. Thus using measured coordinates and surmised coordinates makes it possible to accurately acquire three-dimensional coordinates when the user's finger Fg moves.

Third Embodiment

Figure 11:
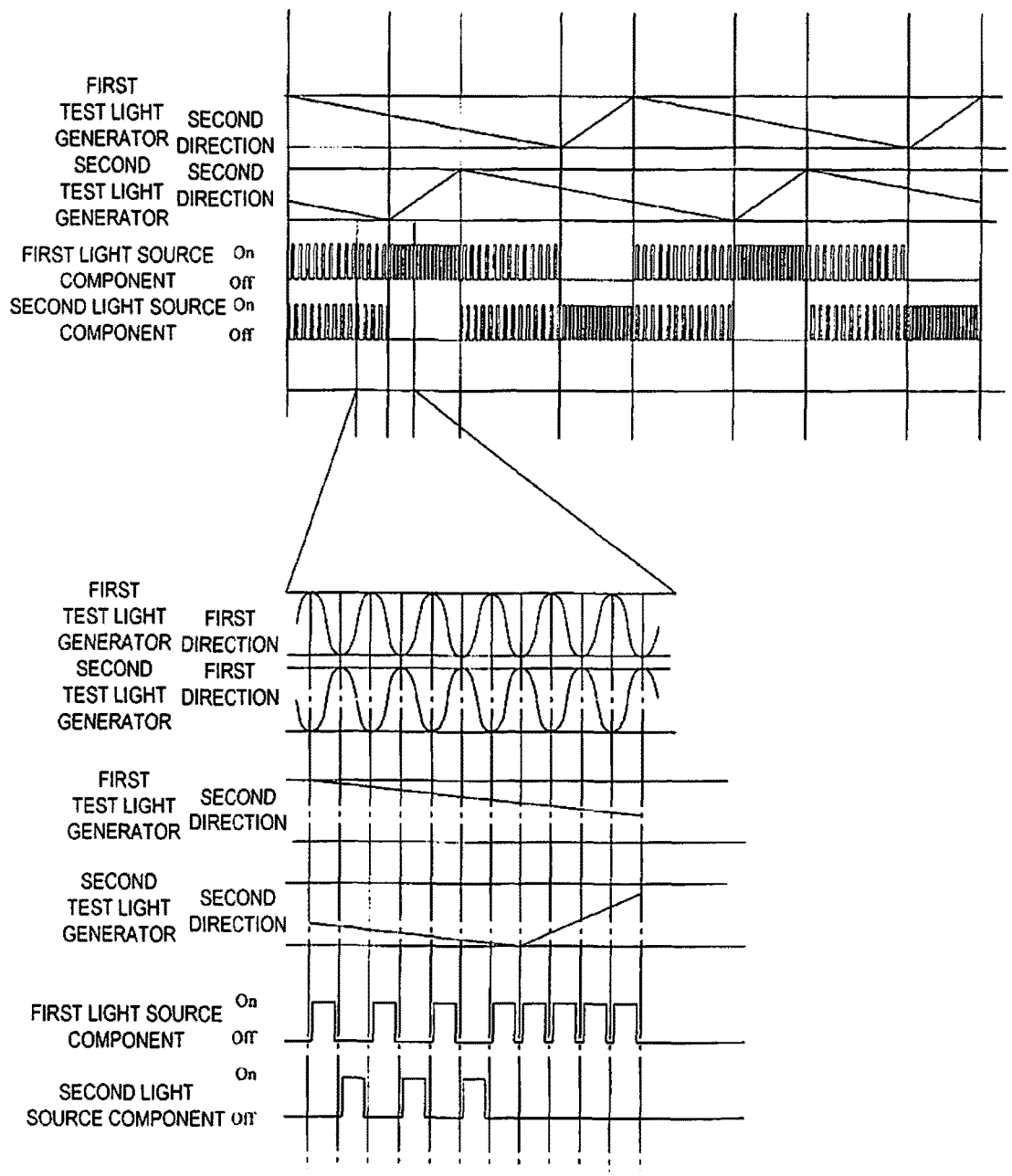
FIG. 11 is a timing chart of the operation in another example of the position sensing device in accordance with a third embodiment.

Another example of the position sensing device in accordance with a third embodiment will now be described through reference to the drawings. FIG. 11 is a timing chart of the operation in another example of the position sensing device in accordance with the third embodiment. The position sensing device A in this embodiment is the same as the position sensing device A in the first embodiment, except that the control of the scanning light source controller 41 by the scanning light source component 100 is different. Specifically, the basic configuration is the same as that of the position sensing device A in the first embodiment, so the same components are numbered the same and will not be described again in detail.

As shown in FIG. 11, the rate at which the reflective face 120 (MEMS 121) of the first test light generator 12 of the first optical system 10 pivots in the second direction is faster during the period of pivoting from bottom to top (return period) than during the period of pivoting from top to bottom (scanning period). Similarly, the rate at which the reflective face 220 (MEMS 221) of the second test light generator 22 of the second optical system 20 pivots in the second direction is faster during the period of pivoting from bottom to top (return period) than during the period of pivoting from top to bottom (scanning period).

The timing at which the reflective face 120 (MEMS 121) of the first test light generator 12 and the reflective face 220 (MEMS 221) of the second test light generator 22 are switched to pivot in the second direction is offset. For example, the scanning light source controller 41 drives the first optical system 10 and the second optical system 20 so that the reflective face 220 (MEMS 221) of the second test light generator 22 will be in the return period while the reflective face 120 (MEMS 121) of the first test light generator 12 is in the middle portion of the scanning period.

As shown in FIG. 11, the scanning light source controller 41 then controls the first optical system 10 and the second optical system 20 so as to switch the scanning of the sensing area Sa with test light from the first light exit position 101 and the scanning of the sensing area Sa with test light from the second light exit position 102 one line at a time.

As shown in FIG. 11, the scanning light source controller 41 controls the first optical system 10 and the second optical system 20 so that the reflective face 220 (MEMS 221) of the second test light generator 22 will be in the return period while the reflective face 120 (MEMS 121) of the first test light generator 12 is in the approximate middle of the scanning period. At this point, the reflective face 120 (MEMS 121) scans back and forth with the test light while scanning the middle region in the second direction of the sensing area Sa. The resolution of the scan can be enhanced by scanning back and forth with the test light in the first direction.

As shown in FIG. 11, the scanning light source controller 41 controls the first optical system 10 and the second optical system 20 so that the reflective face 120 (MEMS 121) of the first test light generator 12 will be in the return period while the reflective face 220 (MEMS 221) of the second test light generator 22 is in the approximate middle of the scanning period. At this point, the reflective face 220 (MEMS 221) scans back and forth with the test light while scanning the middle region in the second direction of the sensing area Sa. The resolution of the scan can be enhanced by scanning back and forth with the test light in the first direction.

When the scanning light source controller 41 controls the first optical system 10 and the second optical system 20 as shown in FIG. 11, the test light is scanned back and forth over the middle region in the second direction of the sensing area Sa, so the resolution of sensing is improved in the middle region in the second direction of the sensing area Sa, and this affords more accurate sensing.

With the position sensing device A in this embodiment, the reflective face 120 (MEMS 121) of the first test light generator 12 is offset from the reflective face 220 (MEMS 221) of the second test light generator 22, but the frequency is the same. However, the frequency need not be the same.

In the illustrated embodiment, with the position sensing device A or the positioning sensing method as mentioned above, the return periods of the test lights (e.g., lights or scanning lights) from the first and second light exit positions 101 and 102 (e.g., light exit positions) are offset with respect to each other, as illustrated in FIG. 11. The emissions of the test lights from the first and second light exit positions 101 and 102 (or the first and second light source component 11 and 21) are alternated every time one line is scanned, as illustrated in FIG. 11. While the test light from one of the first and second light exit positions 101 and 102 (e.g., the second light exit position 102 as illustrated in the enlarged timing chart in FIG. 11) is in the return period, the sensing area Sa (e.g., predetermined area) is reciprocally scanned with the test light from the other one of the first and second light exit positions 101 and 102 (e.g., the first light exit position 101 as illustrated in the enlarged timing chart in FIG. 11).

Fourth Embodiment

Figure 12:
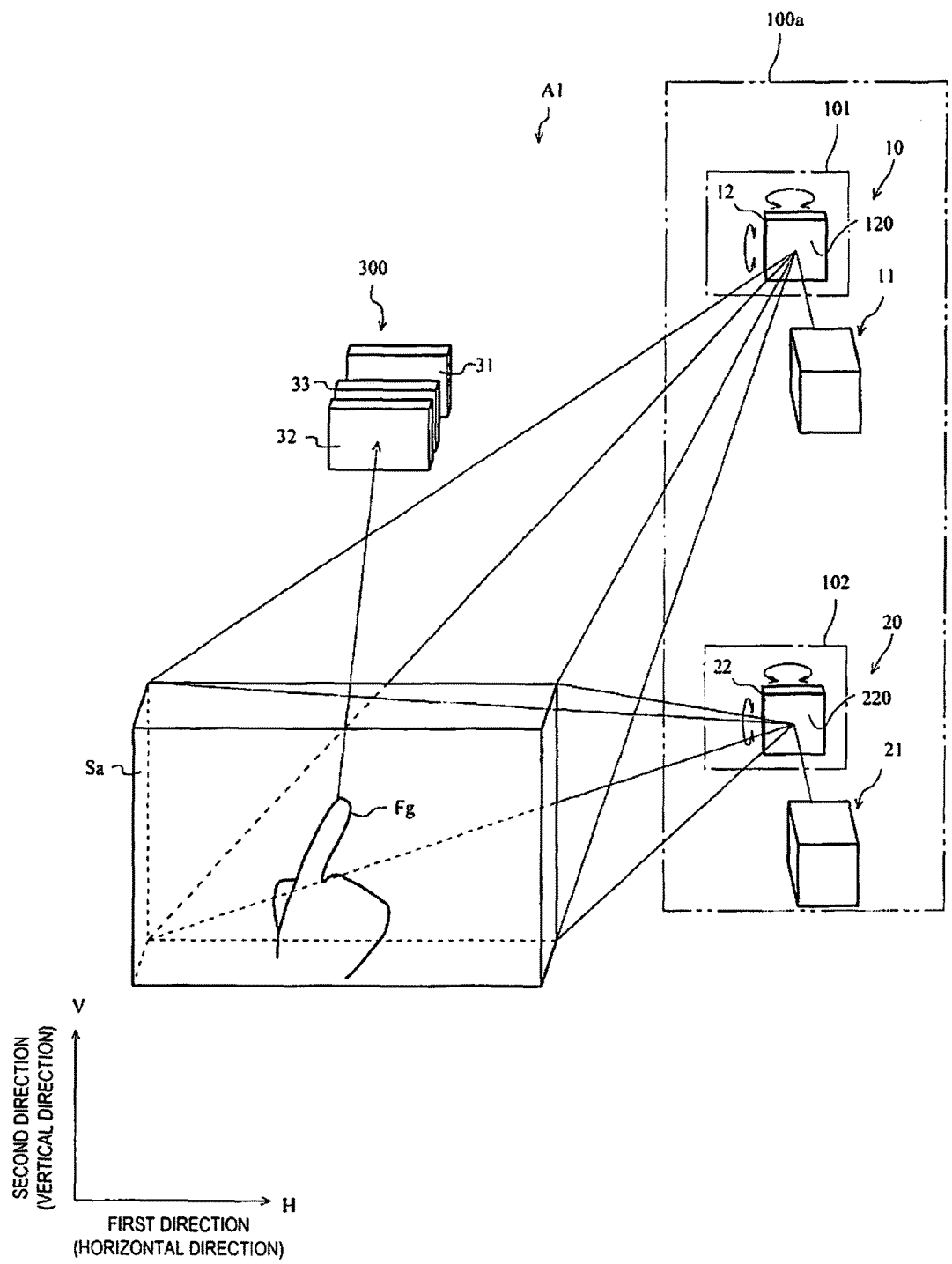
FIG. 12 is a simplified configuration diagram of an example of the position sensing device in accordance with a fourth embodiment.

Another example of the position sensing device in accordance with a fourth embodiment will now be described through reference to the drawings. FIG. 12 is a simplified configuration diagram of an example of the position sensing device in accordance with the fourth embodiment. The light source position sensing device A1 shown in FIG. 12 includes a scanning light source component 100a and the light receiver 300. The light source position sensing device A1 is configured the same as the position sensing device A, except that the relative positions of the first light exit position 101 and the second light exit position 102 are different. Those components that are substantially the same will be numbered the same and not described in detail again. Although not depicted in the drawing, a processor that is the same as the processor 400 is provided.

As discussed above, the scanning frequency with test light in the first direction is higher than the scanning frequency in the second direction. Therefore, in two-dimensional scanning, the first direction (H direction) is the main scanning direction, and the second direction (V direction) is the sub-scanning direction). The position sensing device A has a configuration in which the first light exit position 101 and the second light exit position 102 are separated from each other in the first direction (H direction) of the scanning direction of the test light. Therefore, with the position sensing device A, the first light exit position 101 and the second light exit position 102 are aligned in the main scanning direction.

With the position sensing device A1, however, the first light exit position 101 and the second light exit position 102 are aligned in the sub-scanning direction, which is the second direction (V direction). This layout affords greater latitude in how the first light exit position 101 and the second light exit position 102 are disposed in the position sensing device A1.

With the position sensing device A1, for the sake of contrast, the main scanning direction and the sub-scanning direction are the same as in the position sensing device A, that is, the main scanning direction is the first direction (horizontal direction), and the sub-scanning direction is the second direction (vertical direction), but this is not the only option. If the first direction (horizontal direction) is the sub-scanning direction and the second direction (vertical direction) is the main scanning direction, then it is possible for the first light exit position 101 and the second light exit position 102 to have the same configuration as in the position sensing device A, in which they are arranged in the first direction (horizontal direction).

Fifth Embodiment

Figure 13:
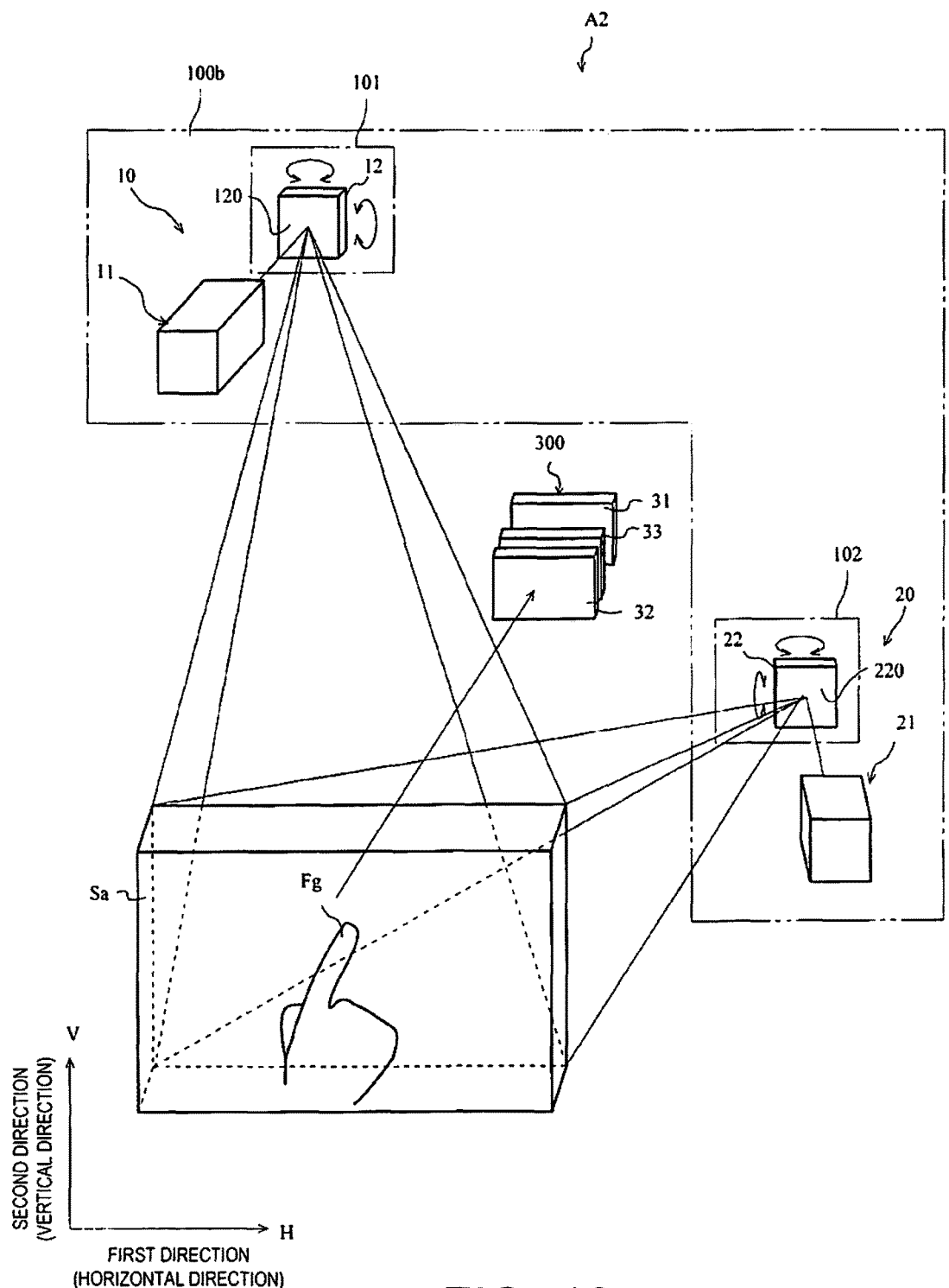
FIG. 13 is a simplified configuration diagram of an example of the position sensing device in accordance with a fifth embodiment.
Figure 14A:
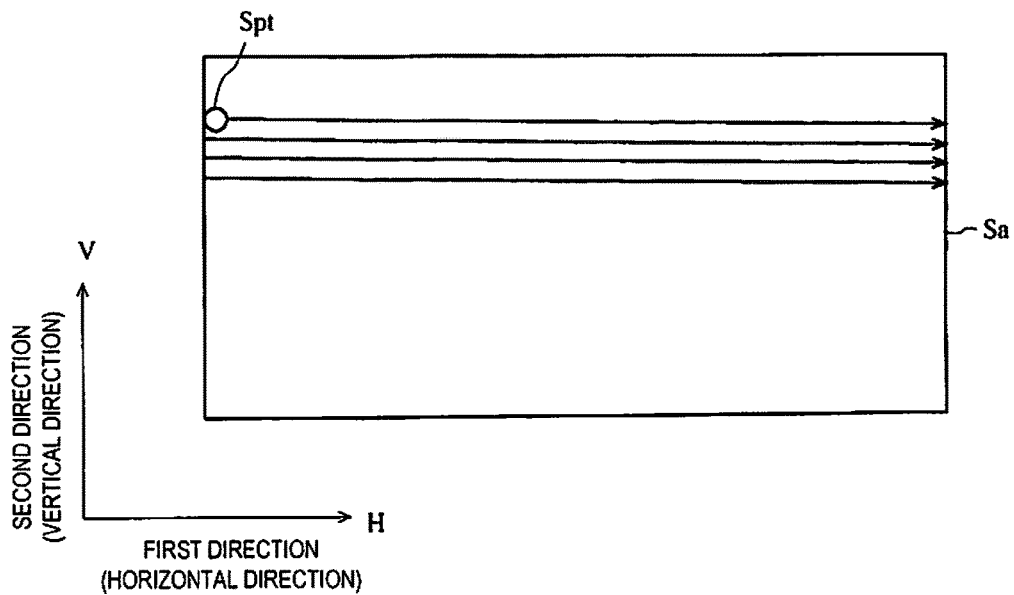
FIG. 14A is a diagram of two-dimensional scanning of test light from the first light exit position.
Figure 14B:
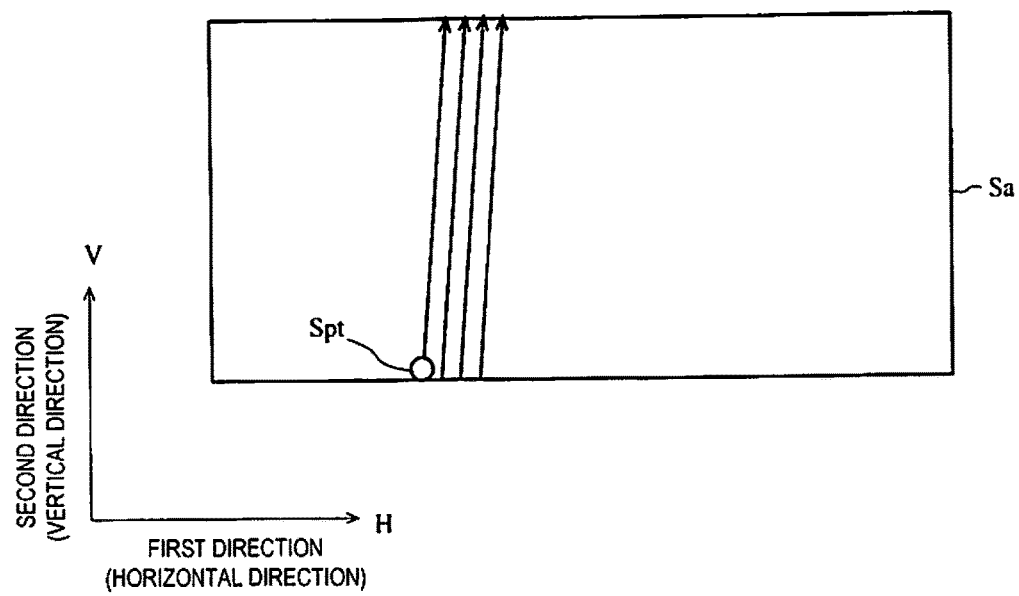
FIG. 14B is a diagram of two-dimensional scanning of test light from the second light exit position.

Another example of the position sensing device in accordance with a fifth embodiment will now be described through reference to the drawings. FIG. 13 is a simplified configuration diagram of an example of the position sensing device in accordance with the fifth embodiment. FIG. 14A is a diagram of two-dimensional scanning of test light from the first light exit position. FIG. 14B is a diagram of two-dimensional scanning of test light from the second light exit position. The position sensing device A2 shown in FIG. 13 includes a scanning light source component 100b and the light receiver 300. The light source position sensing device A2 is configured the same as the light source position sensing device A, except that the relative positions of the first light exit position 101 and the second light exit position 102 are different. Those components that are substantially the same will be numbered the same and not described in detail again. Although not depicted in the drawing, a processor that is the same as the processor 400 is provided.

With the position sensing device A and the position sensing device A1, the light exit positions are aligned in the scanning direction (main scanning direction and sub-scanning direction) in which the sensing area Sa is two-dimensionally scanned with test light. With the position sensing device A2 shown in FIG. 13, the first light exit position 101 and the second light exit position 102 are offset in both the first and second directions, as viewed from the sensing area Sa.

FIG. 14A shows a state in which the sensing area Sa is two-dimensionally scanned with test light from the first light exit position 101. The first direction (horizontal direction) is the main scanning direction with a higher frequency, and the second direction (vertical direction) is the sub-scanning direction with a lower frequency.

FIG. 14B shows a state in which the sensing area Sa is two-dimensionally scanned with test light from the second light exit position 102. The first direction (horizontal direction) is the sub-scanning direction with a lower frequency, and the second direction (vertical direction) is the main scanning direction with a higher frequency.

Thus, the configuration can be such that the scanning direction of test light from the first light exit position 101 is different from the scanning direction of test light from the second light exit position 102.

With a configuration in which the main scanning direction and the sub-scanning direction are not perpendicular, the area scanned with test light from the first light exit position 101 and the area scanned with test light from the second light exit position 102 overlap in the sensing area Sa.

Sixth Embodiment

Figure 15:
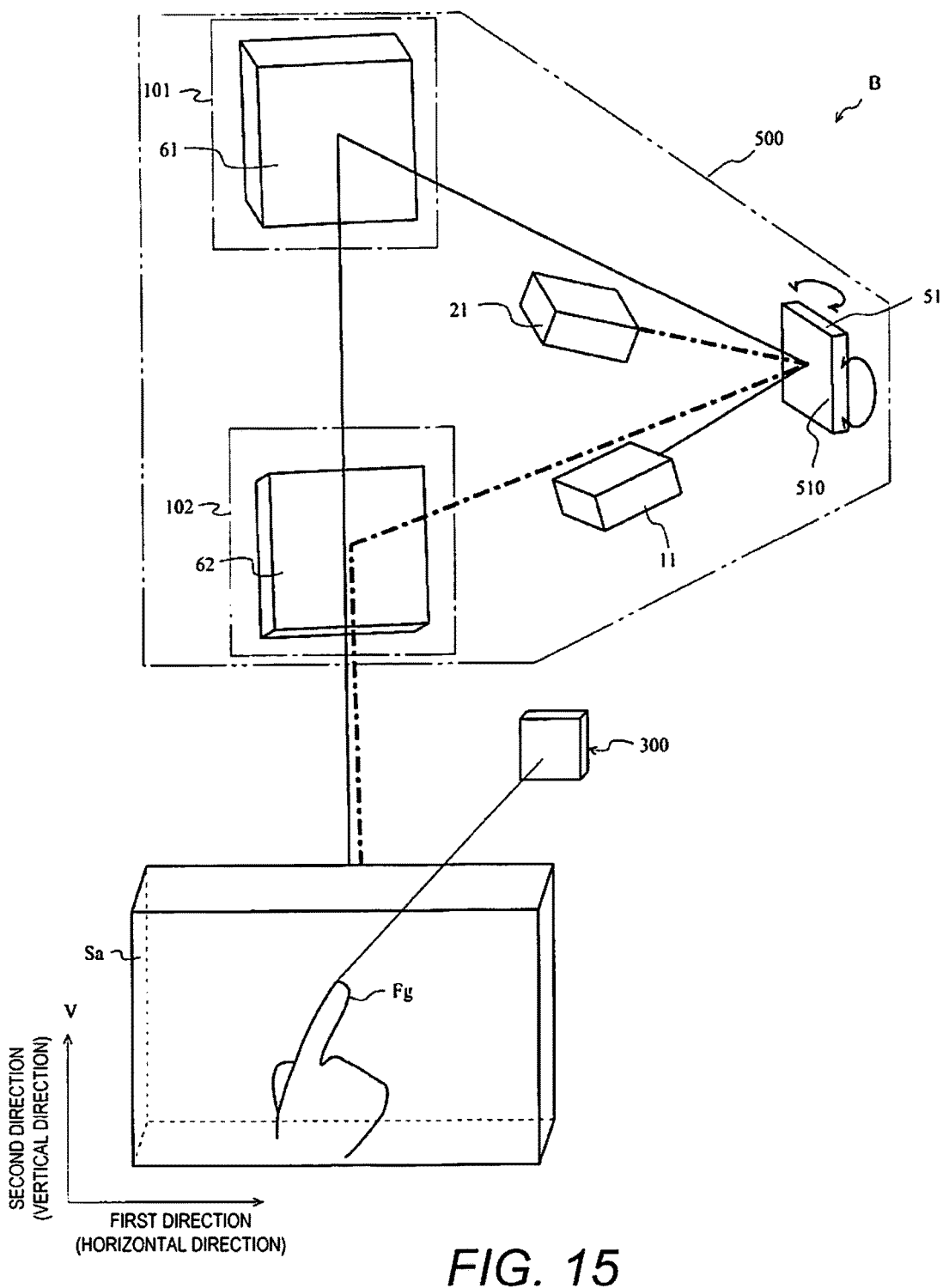
FIG. 15 is a simplified layout diagram of another example of the position sensing device in accordance with a sixth embodiment.
Figure 16:
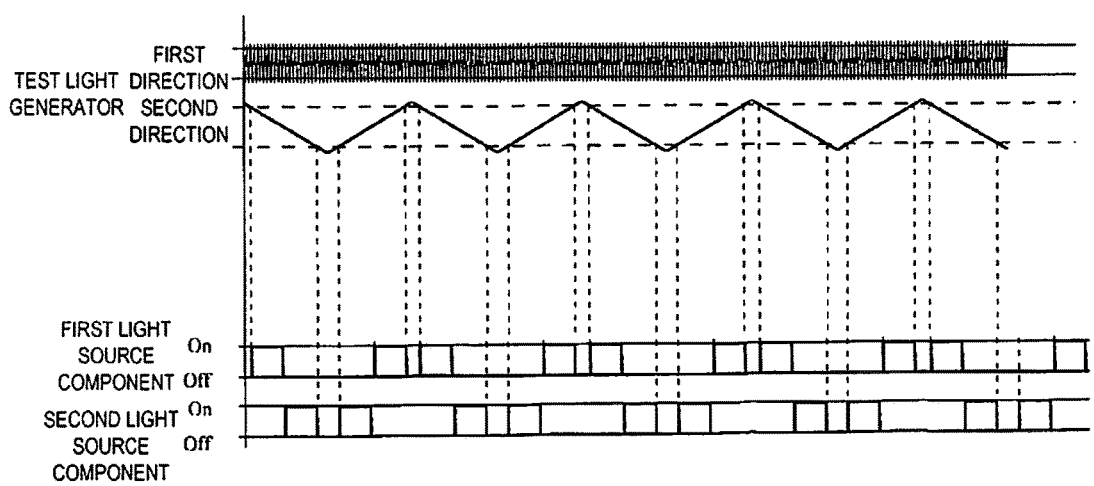
FIG. 16 is a timing chart of the operation of the position sensing device shown in FIG. 15.

Another example of the position sensing device in accordance with a sixth embodiment will now be described through reference to the drawings. FIG. 15 is a simplified layout diagram of another example of the position sensing device in accordance with the sixth embodiment. FIG. 16 is a timing chart of the operation of the position sensing device shown in FIG. 15. Those components that are substantially the same as the components described above will be numbered the same and not described in detail again.

As shown in FIG. 15, a position sensing device B includes a scanning light source component 500 and the light receiver 300. Although not depicted in the drawing, a processor that is the same as the processor 400 is provided. The scanning light source component 500 includes a first light source component 11 and a second light source component 21 configured the same as in the optical position sensor A, and a test light generator 51 that includes a reflective face 510. The first light exit position 101 and the second light exit position 102 of the scanning light source component 500 are provided with a first reflector 61 and a second reflector 62 that reflect test light generated by the test light generator 51 toward the sensing area Sa. The top row of the timing chart in FIG. 16 shows the pivot angle in the second direction of the reflective faces of the test light generator, and under this is shown the timing of light emission by the first light source component and second light source component.

As shown in FIG. 15, the position sensing device B emits light from the first light source component 11 and the second light source component 21 toward the test light generator 51. As shown in FIG. 16, the first light source component 11 emits its light when the reflective face 510 of the test light generator 51 has swung upward from a middle position in the second direction. The light emitted from the first light source component 11 is incident on and reflected by the first reflector 61 as test light that has been scanned in the first and second directions. The test light reflected by the first reflector 61 illuminates the sensing area Sa and scans over the sensing area Sa.

Similarly, as shown in FIG. 16, the second light source component 21 emits its light when the reflective face 510 of the test light generator 51 has swung downward from a middle position in the second direction. The light emitted from the second light source component 21 is incident on and reflected by the second reflector 62 as test light that has been scanned in the first and second directions. The test light reflected by the second reflector 62 illuminates the sensing area Sa and scans over the sensing area Sa.

That is, with the position sensing device B, the first reflector 61 is provided to the first light exit position 101, and light reflected by the first reflector 61 is emitted as test light from the first light exit position 101. Also, the second reflector 62 is provided to the second light exit position 102, and light reflected by the second reflector 62 is emitted as test light from the second light exit position 102.

As discussed above, with the position sensing device B, the scanning light source controller 41 controls the scanning light source component 500 as above, and test light can be emitted from two light exit positions with the single test light generator 51. Consequently, since fewer test light generators 51 are required, the structure of the position sensing device B can be simplified.

The configuration is such that light from the first light source component 11 is incident on the first reflector 61, and light from the second light source component 21 is incident on the second reflector 62, depending on the pivot angle of the reflective face 510 of the test light generator 51 in the second direction. Accordingly, the first light exit position 101 at which the first reflector 61 is disposed and the second light exit position 102 at which the second reflector 62 is disposed are separated in at least the second direction. Depending on the angles of the first light source component 11 and the second light source component 21, it is also possible for the first light exit position 101 and the second light exit position 102 to be offset in both the first direction and the second direction.

In this embodiment, the configuration is such that test light is emitted from two light exit positions by splitting the pivot angle of the reflective face 510 of the test light generator 51 in the second direction in two, but this is not the only option, and the configuration may instead be such that test light is emitted from three or more light exit positions by splitting the pivot angle into three or more.

In this embodiment, the first reflector 61 is disposed at the first light exit position 101 and the second reflector 62 is disposed at the second light exit position 102, with a reflector disposed at each of the plurality of light exit positions, but this is not the only option. There may be light exit positions at which a reflector is disposed and at which no reflector is disposed, and there may be light exit positions at which test light reflected by a reflector is emitted, and light exit positions at which test light is emitted directly from the optical system.

Also, a reflector may be provided at each light exit position, the reflectors made movable (such as being able to slide or having a variable angle), and the test light from the optical system emitted directly from certain light exit positions. Or, the reflectors can be moved to adjust the test light illumination angle and change the sensing area.

In the illustrated embodiment, with the position sensing device B as mentioned above, the scanning light source component 500 includes the first and second reflectors 61 and 62 (e.g., reflectors) disposed at the first and second light exit positions 101 and 102 (e.g., at least one of the light exit positions), respectively. The first and second reflectors 61 and 62 are configured to reflect the test light (e.g., light) from the test light generator 51 (e.g., scanning light generator) toward the sensing area Sa (e.g., predetermined area).

In the illustrated embodiment, with the position sensing device B as mentioned above, the scanning light source component 500 includes the same number (two) of the first and second light source components 11 and 21 (e.g., light sources) as the first and second light exit positions 101 and 102 (light exit positions). The number (two) of the first and second light source components 11 and 21 is larger than the number (one) of the test light generator 51 (e.g., at least one scanning light generator). As illustrated in FIG. 15, the test lights (lights) from the first and second light source components 11 and 21 are incident at different angles on the reflective face 510 of the test light generator 51, and are led toward the corresponding light exit positions 101 and 102 (the corresponding reflectors 61 and 62), respectively.

In the illustrated embodiment, as illustrated in FIG. 15, the test light can be emitted from two light exit positions with the single test light generator 51. However, the position sensing device B can further include another test light generator, and the configuration can be such that the lights from the first light source component 11 and the second light source component 21 are incident on the test light generators, respectively, and that the lights reflected on the test light generators are further incident on and reflected by the first and second reflectors 61 and 62, respectively, to scan the sensing area Sa. With this configuration of the position sensing device B, the scanning light source component 500 includes the same number (two) of the first and second light source components 11 and 21 (e.g., light sources) as the first and second light exit positions 101 and 102, and the same number (two) of the test light generators (scanning light generators) as the first and second light exit positions 101 and 102.

Seventh Embodiment

Figure 17:
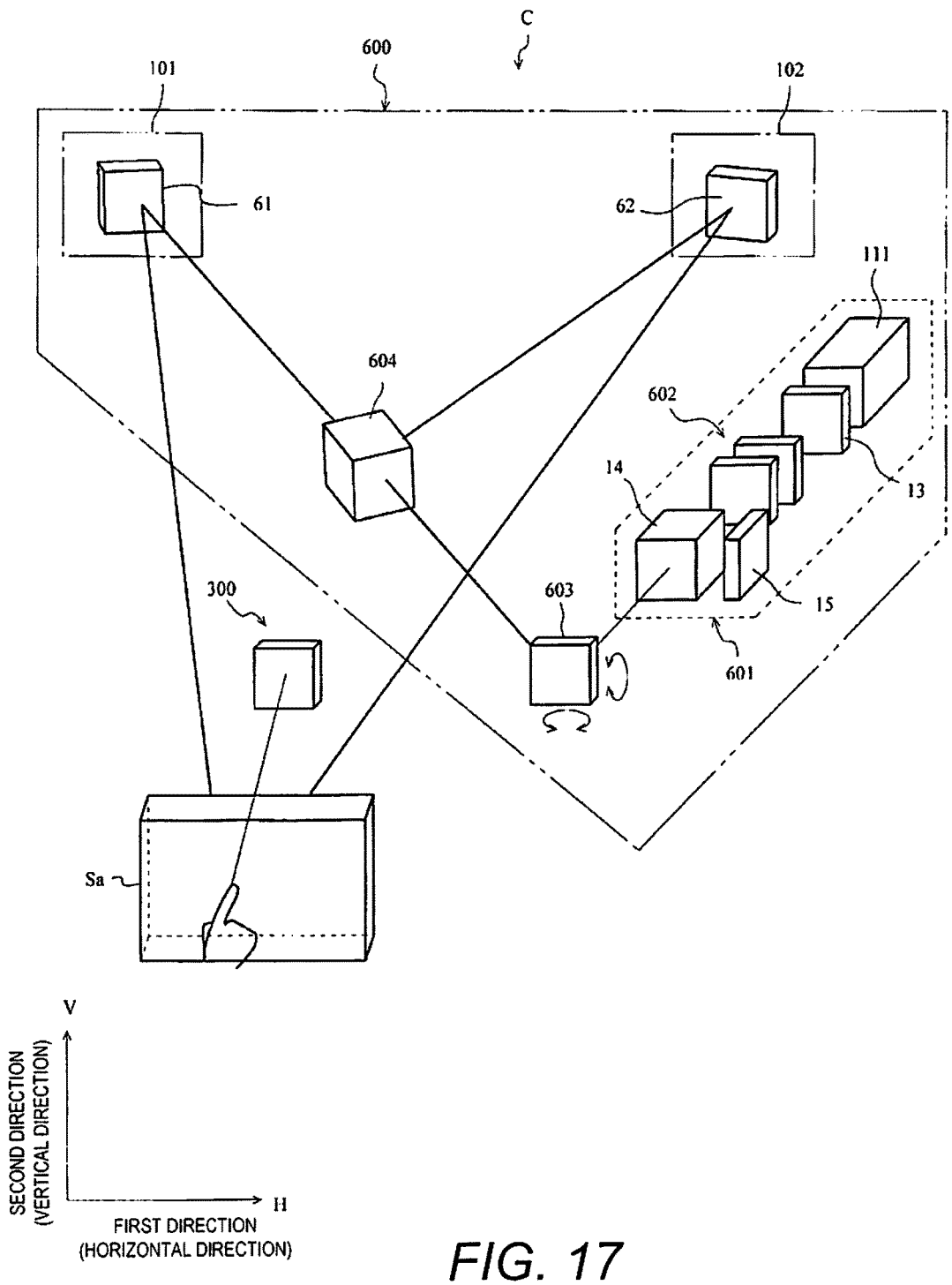
FIG. 17 is a simplified layout diagram of yet another example of the position sensing device in accordance with a seventh embodiment.
Figure 18:
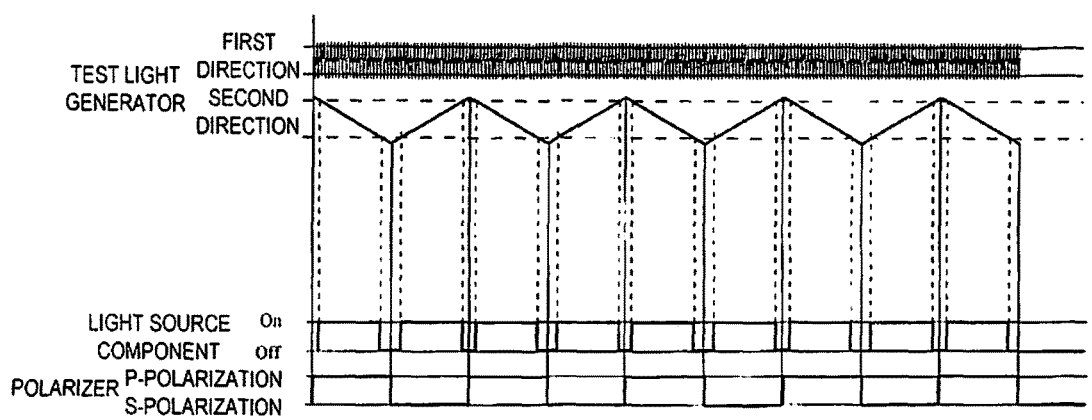
FIG. 18 is a timing chart of the operation of the position sensing device shown in FIG. 17.

Another example of the position sensing device in accordance with a seventh embodiment will now be described through reference to the drawings. FIG. 17 is a simplified layout diagram of yet another example of the position sensing device in accordance with the seventh embodiment. FIG. 18 is a timing chart of the operation of the position sensing device shown in FIG. 17. As shown in FIG. 17, a position sensing device C includes a scanning light source component 600 and the light receiver 300. Although not depicted in the drawing, a processor that is the same as the processor 400 is provided. The first reflector 61 is provided to the first light exit position 101 of the scanning light source component 600, and the second reflector 62 to the second light exit position 102. The scanning light source component 600 includes a light source component 601, a polarizer 602 (polarization switching component) included in the light source component 601, a test light generator 603, and a polarized beam splitter 604 (optical path switching component). The light source component 601 has the same configuration as the first light source component 11 of the position sensing device A, except that it includes the polarizer 602, so the same components are numbered the same and will not be described again in detail. Also, the test light generator 603 has the same configuration as the first test light generator 12, and therefore will not be described again in detail.

The light source component 601 emits infrared light that has been linearly polarized. The infrared light emitted from the light source component 601 is p-polarized light. The laser light emitted from the light source component 601 is incident on the polarizer 602. The polarizer 602 is an element that converts the polarization direction of transmitted light. The polarizer 602 used here is a combination of a polarization filter 6021 and a liquid crystal element 6022, but may instead be something else, and a wide range of components capable of varying the polarization direction can be used.

The infrared light transmitted by the polarizer 602 is incident on the test light generator 603. The test light generator 603 includes a reflective face 630 that pivots in the first and second directions, and generates test light in which the infrared light incident on the reflective face 630 is scanned in the first and second directions. The test light generated by the test light generator 603 is incident on the polarized beam splitter 604. The polarized beam splitter 604 has a reflective face that transmits p-polarized light and reflects s-polarized light. If the test light incident on the polarized beam splitter 604 is p-polarized light, it passes through the polarized beam splitter 604 and is incident on the first reflector 61, and the test light reflected by the first reflector 61 is scanned over the sensing area Sa. If the test light incident on the polarized beam splitter 604 is s-polarized light, it is reflected by the reflective face of the polarized beam splitter 604 and is incident on the second reflector 62, and the test light reflected by the second reflector 62 is scanned over the sensing area Sa.

With the position sensing device C, the processor 400 controls the polarizer 602 so that the polarization of the transmitted light is switched between p-polarization and s-polarization. The light transmitted by the polarizer 602 is then switched to p-polarization at the point of switching from the return period to the scanning period in the second direction of the reflective face 630, the result being that the sensing area Sa is scanned with test light from the first light exit position 101 to which the first reflector 61 is provided. Similarly, light transmitted by the polarizer 602 is switched to s-polarization at the point of switching from the return period to the scanning period in the second direction of the reflective face 630, the result being that the sensing area Sa is scanned with test light from the second light exit position 102 to which the second reflector 62 is provided.

The position sensing device C is configured to include one light source component 601 and one test light generator 603, which simplifies the configuration and allows the position sensing device C to be made more compact.

In the illustrated embodiment, with the position sensing device C, the scanning light source component 600 further includes the polarized beam splitter 604 (e.g., optical path switching component) that is configured to alternately guide the optical path of the test light (e.g., light) from the test light generator 603 to the first and second light exit positions 101 and 102, as illustrated in FIG. 17.

In the illustrated embodiment, with the position sensing device C, the scanning light source component 600 further includes the polarizer 602 (e.g., polarization switching component) that is disposed between the light emitting element 111 (e.g., light source) and the test light generator 603 (e.g., scanning light generator) and is configured to switch the polarization direction of the light from the light emitting element 111. The optical path switching component includes the polarized beam splitter 604 that is disposed between the test light generator 603 and the first and second light exit positions 101 and 102 and is configured to selectively guide the optical path of the test light (e.g., light) from the test light generator 603 to the first and second light exit positions 101 and 102 by reflecting or transmitting the test light according to the polarization direction of the test light.

Eighth Embodiment

Figure 19:
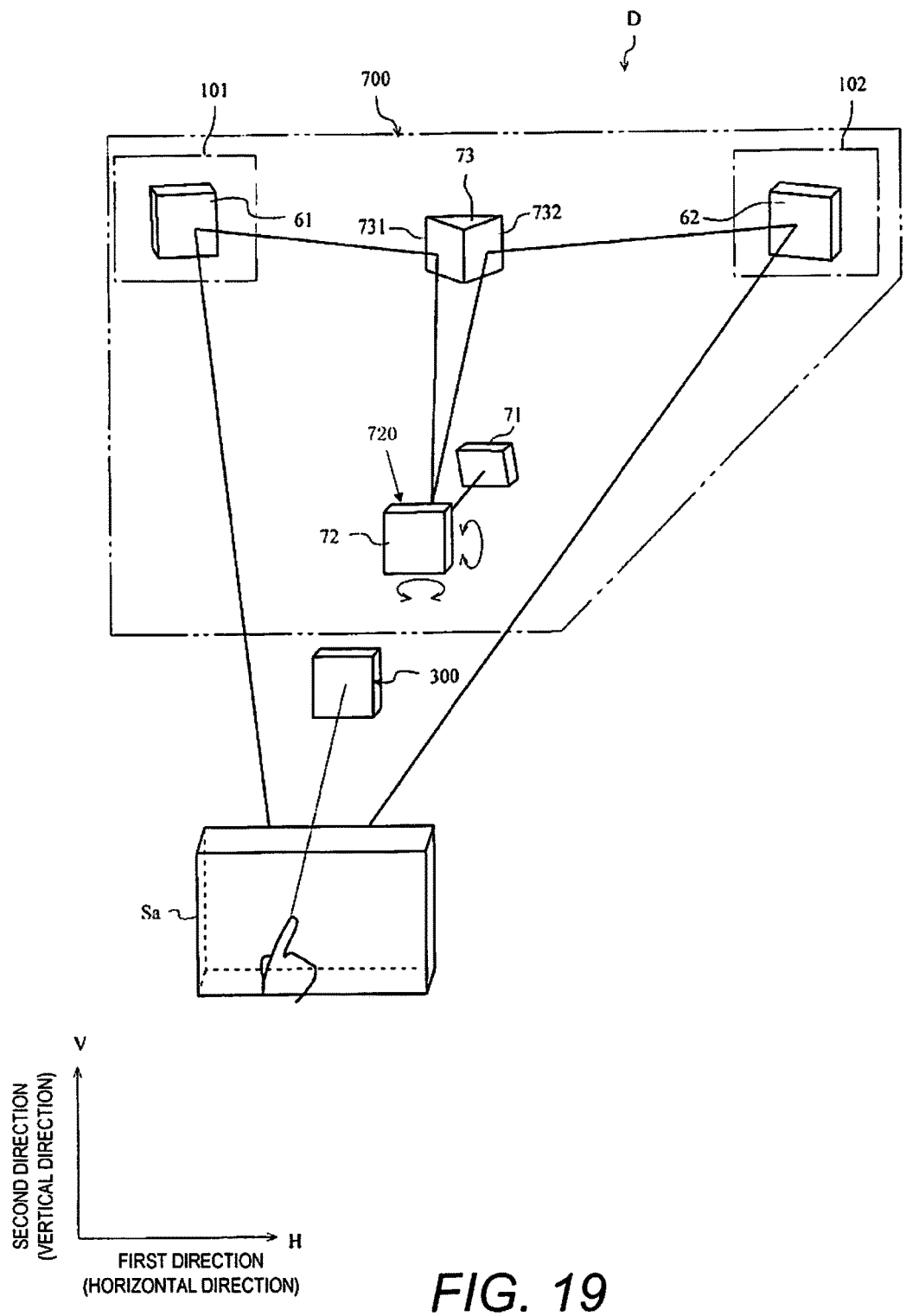
FIG. 19 is a simplified layout diagram of yet another example of the position sensing device in accordance with an eighth embodiment.
Figure 20:
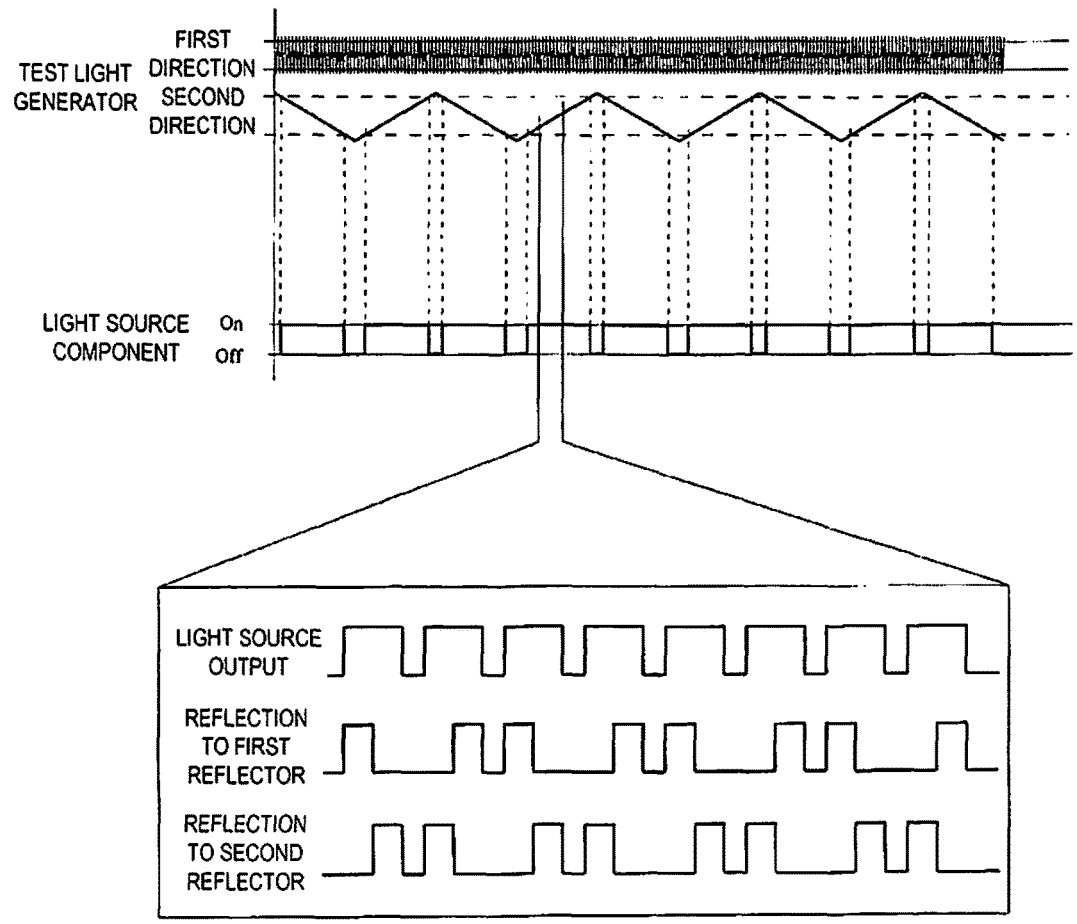
FIG. 20 is a timing chart of the operation of the position sensing device shown in FIG. 19.

Another example of the position sensing device in accordance with an eighth embodiment will now be described through reference to the drawings. FIG. 19 is a simplified layout diagram of yet another example of the position sensing device in accordance with the eighth embodiment. FIG. 20 is a timing chart of the operation of the position sensing device shown in FIG. 19.

The position sensing device D shown in FIG. 19 has the same configuration as the position sensing device B, except that a scanning light source component 700 is provided. Therefore, the components of the position sensing device D that are substantially the same as in the position sensing device B are numbered the same and will not be described again in detail.

As shown in FIG. 19, the position sensing device D includes the scanning light source component 700 and the light receiver 300. Although not depicted in the drawing, a processor that is the same as the processor 400 is provided. The first reflector 61 is provided to the first light exit position 101 of the scanning light source component 700, and the second reflector 62 to the second light exit position 102. The scanning light source component 700 includes a light source component 71, a test light generator 72, and an optical path changing mirror 73 (optical path switching component). The light source component 71 and the test light generator 72 are configured the same as the first light source component 11 and the first test light generator 12 in the position sensing device A, and will not be described again in detail.

As shown in FIG. 19, the optical path changing mirror 73 has a first mirror 731 and a second mirror 732. The first mirror 731 and the second mirror 732 are aligned in the first direction. The test light generated by the test light generator 72 is made to be incident on the first mirror 731 or the second mirror 732 by being scanned in the first direction.

When the reflective face 720 of the test light generator 72 pivots and the test light is incident on the first mirror 731, it is reflected by the first mirror 731 (its optical path is changed) and it is incident on the first reflector 61. The test light is reflected by the first reflector 61, emitted from the first light exit position 101, and two-dimensionally scanned over the sensing area Sa.

Also, when the reflective face 720 of the test light generator 72 pivots and the test light is incident on the second mirror 732, it is reflected by the second mirror 732 (its optical path is changed) and it is incident on the second reflector 62. The test light is reflected by the second reflector 62, emitted from the second light exit position 102, and two-dimensionally scanned over the sensing area Sa.

Figure 21:
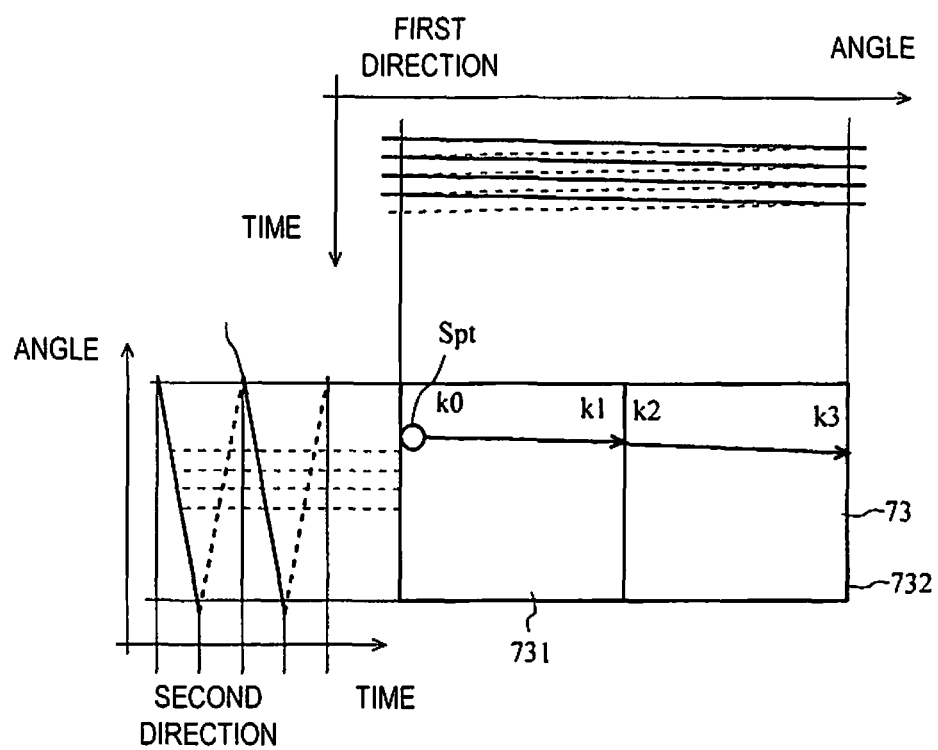
FIG. 21 is a diagram of how the reflective face of the test light generator pivots, and how test light illuminates an optical path changing mirror.
Figure 22:
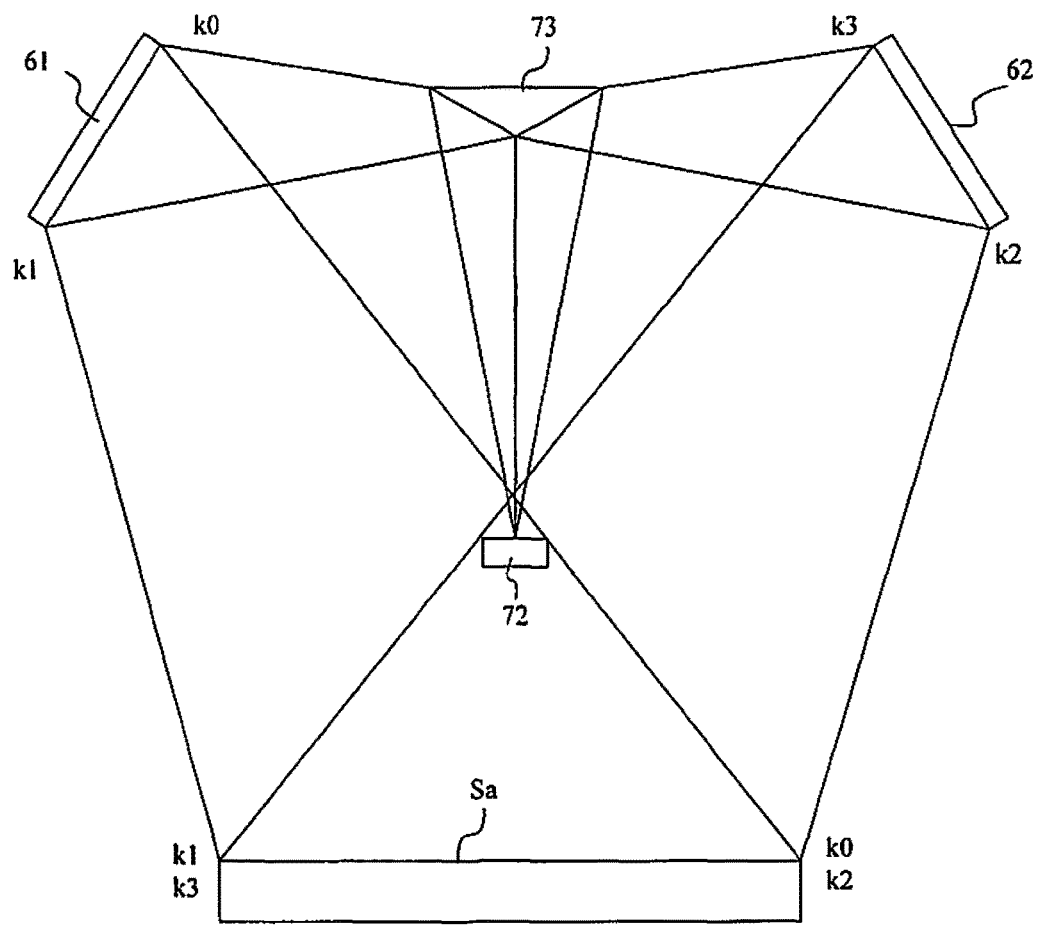
FIG. 22 is a plan view of the optical path of the position sensing device.
Figure 23:
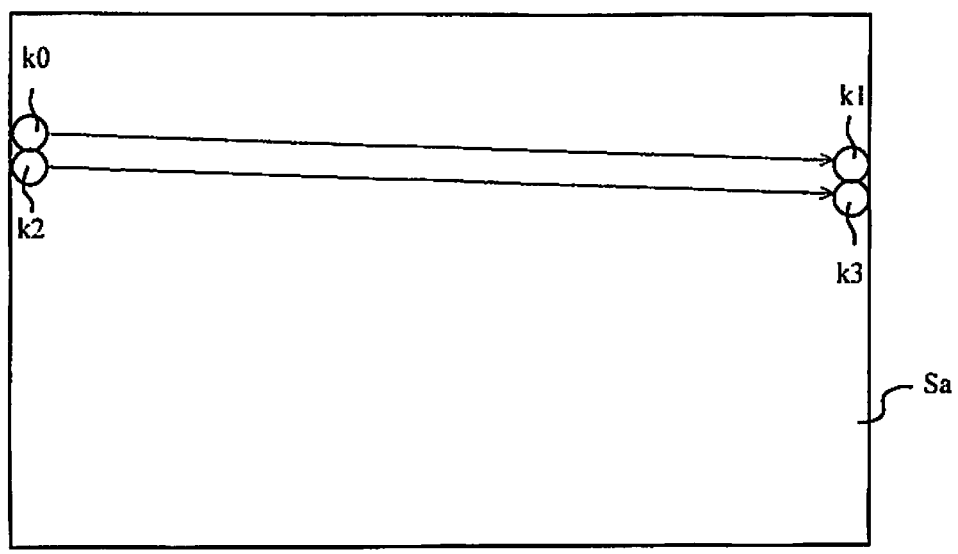
FIG. 23 is a simplified diagram of a state in which a test area is scanned with test light.

The operation of the position sensing device in this embodiment will now be described through reference to the drawings. FIG. 21 is a diagram of how the reflective face of the test light generator pivots, and how test light illuminates an optical path changing mirror. FIG. 22 is a plan view of the optical path of the position sensing device. FIG. 23 is a simplified diagram of a state in which a test area is scanned with test light.

FIG. 21 is similar to FIG. 5A in that it shows at the top the change over time in the pivot angle in the first direction, and on the left the change over time in the pivot angle in the second direction. The rectangle indicates the optical path changing mirror 73 as seen from the test light generator 72 side, with the left side of the middle border being the first mirror 731, and the right side the second mirror 732.

As shown in FIG. 22, the test light generator 72 scans light from the pivoting light source component 71 in the first and second directions, so that the light is incident on the optical path changing mirror 73. The optical path changing mirror 73 is split in the middle in the first direction into the first mirror 731 and the second mirror 732, and in FIG. 22, when the reflective face 720 pivots counter-clockwise, the test light scans the first mirror 731.

As shown in FIG. 21, when the optical path changing mirror 73 pivots the test light from the left to the center, the test light is reflected toward the first reflector 61 from the left end k0 to the middle portion k1. Since the reflection inverts left and right, the sensing area Sa is scanned from right to left with the test light from the first light exit position 101.

When the reflective face 720 then pivots from the center to the right end, the test light is reflected toward the second reflector 62 from the middle portion k2 to the right end k3. Since the reflection inverts left and right, the sensing area Sa is scanned from left to right with the test light from the second light exit position 102. Specifically, because the first mirror 731 and the second mirror 732 of the optical path changing mirror 73 are disposed in the first direction, which is the main scanning direction, the scanning of the sensing area Sa is performed back and forth, one line at a time, with the test light from the first light exit position 101 and the test light from the second light exit position 102.

As shown in FIG. 23, the scanning controller 412 pivots the reflective face of the test light generator 72 so that the test light will go beyond the illumination range in the first and second directions of the optical path changing mirror 73. The light source controller 411 then controls the light source component 71 so that emission of light stops when the test light leaves the range of the optical path changing mirror 73.

The scanning light source controller 41 need only control the light source component 71 and the test light generator 72 so that test light will fall within the optical path changing mirror 73, so control is simple. Also, since one light source component 71 and one test light generator 72 are provided, the configuration can be simplified and the device can be made more compact.

In this embodiment, an example is described in which the optical path changing mirror 73 includes two mirrors, namely, the first mirror 731 and the second mirror 732, but this is not the only option. A optical path changing mirror in which three or more mirrors are aligned in the scanning direction may be used, which will allow test light to be emitted from three or more light exit positions.

Also, in this embodiment the optical path changing mirror 73 is configured such that the two mirrors (the first mirror 731 and the second mirror 732) are aligned in the first direction (the main scanning direction), but this is not the only option, and they may instead be aligned in the second direction (the sub-scanning direction). If a plurality of mirrors are aligned in the sub-scanning direction, the mirrors will be switched whenever scanning of the sensing area Sa with test light reflected by one mirror has been completed twice. For example, after the entire sensing area Sa has been scanned twice with the test light from the first light exit position 101, the entire sensing area Sa is scanned twice with the test light from the second light exit position 102. The scanning is repeated in this way.

The coordinates of the user's finger Fg with respect to the first light exit position 101 and the coordinates with respect to the second light exit position 102 are determined by the same method as in the first embodiment. Since the configuration is such that the optical path is changed in the middle of the optical path changing mirror 73, the relation between coordinates and the time since the start of emission from the light source component 71 is different from that in the first embodiment.

In the illustrated embodiment, with the position sensing device D as mentioned above, the scanning light source component 700 further includes the optical path changing mirror 73 (e.g., optical path switching component) that is configured to alternately guide the optical path of the test light (e.g., light) from the test light generator 72 to the first and second light exit positions 101 and 102, as illustrated in FIGS. 19 and 22.

In the illustrated embodiment, with the position sensing device D as mentioned above, the optical path switching component includes the optical path changing mirror 73 (e.g., reflection member) that has the first and second mirrors 731 and 732 (e.g., reflective faces) that are configured to selectively reflect the test light (e.g., light) to the first and second reflectors 61 and 62 (e.g., a plurality of reflectors) according to the incidence position of the test light on the first and second mirrors 731 and 732 in the first direction.

In the illustrated embodiment, with the position sensing device D as mentioned above, the first and second mirrors 731 and 732 are split in the first direction.

Ninth Embodiment

Figure 24:
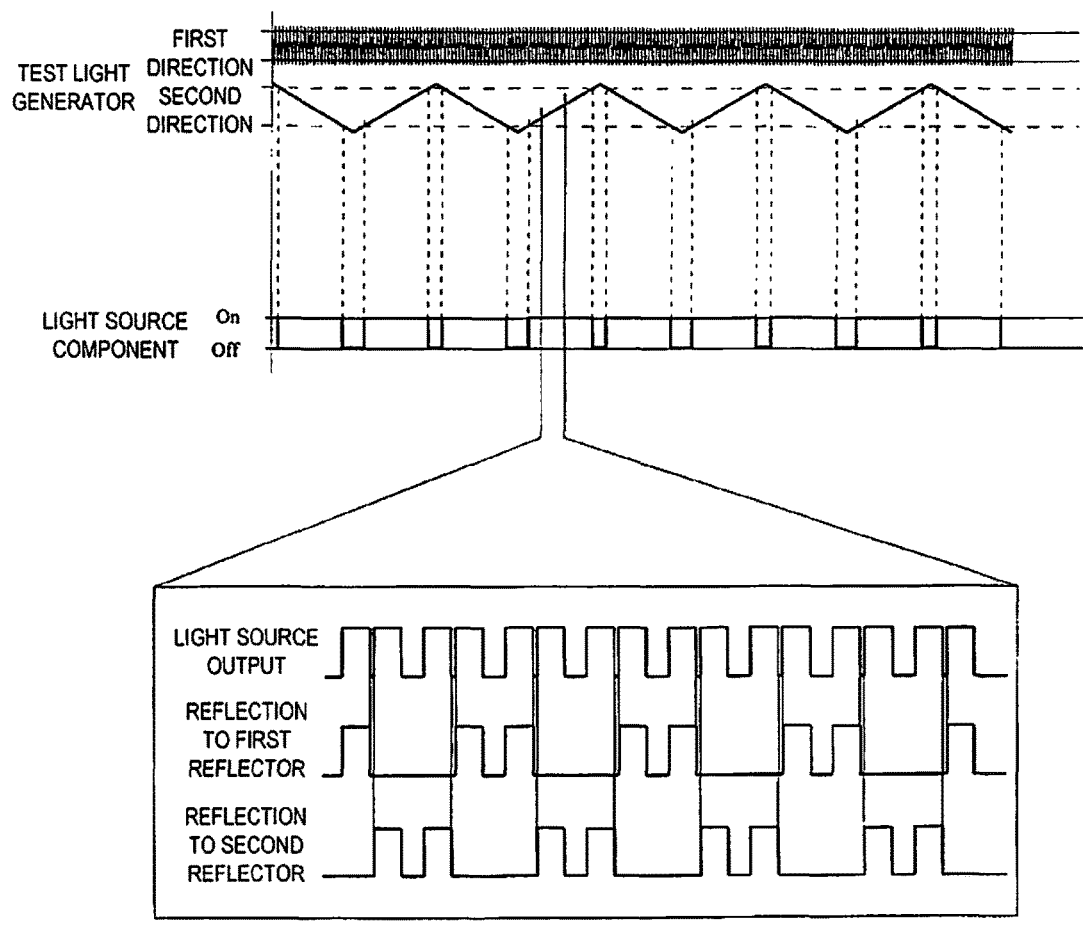
FIG. 24 is a timing chart of the operation in yet another example of the position sensing device in accordance with a ninth embodiment.

Another example of the position sensing device in accordance with a ninth embodiment will now be described through reference to the drawings. FIG. 24 is a timing chart of the operation in yet another example of the position sensing device in accordance with the ninth embodiment. The configuration of the position sensing device D in this embodiment is the same as that in the eighth embodiment, so the configuration will not be described again.

With the position sensing device D, there is a period during which the spot of test light generated by the test light generator 72 that illuminates the optical path changing mirror 73 illuminates both the first mirror 731 and the second mirror 732 in the middle border portion. Therefore, as shown in FIG. 24, the light source controller 411 stops the emission of infrared light from the light source component 71 when the test light spot goes beyond the boundary of the first mirror 731 and the second mirror 732. This suppresses the emission of test light simultaneously from the first light exit position 101 and the second light exit position 102, and improves sensing accuracy.

In the illustrated embodiment, with the position sensing device D as mentioned above, the processor 400 is configured to control the light source component 71 (e.g., light source) to stop emitting the test light (e.g., light) while switching the first and second light exit positions 101 and 102, as illustrated in FIG. 24.

Tenth Embodiment

Figure 25:
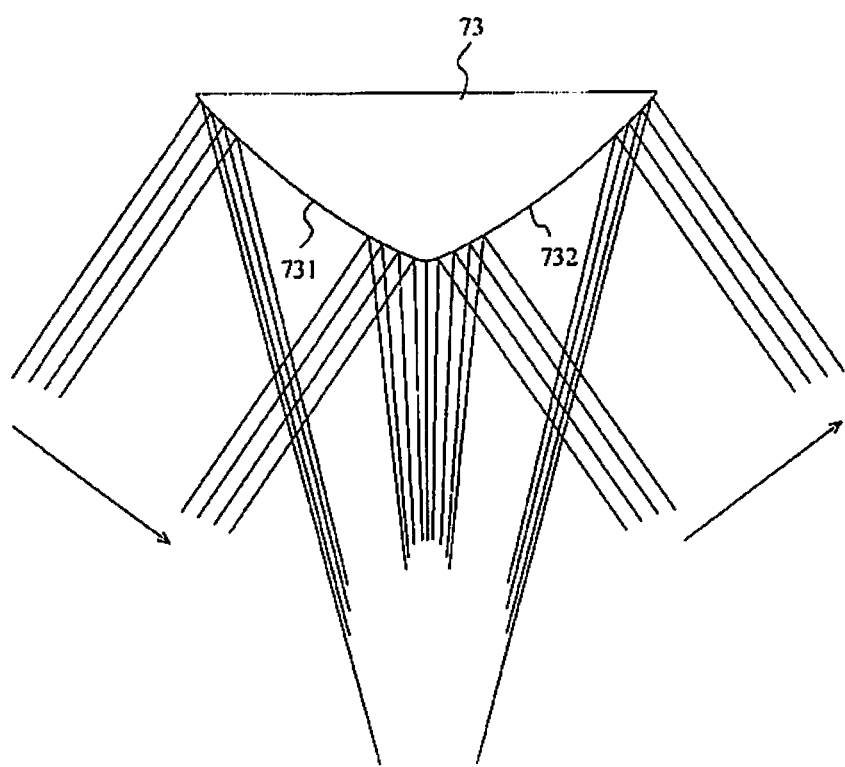
FIG. 25 is a plan view of the optical path changing mirror used in the position sensing device in accordance with a tenth embodiment.

Another example of the position sensing device in accordance with a tenth embodiment will now be described through reference to the drawings. FIG. 25 is a plan view of the optical path changing mirror used in the position sensing device in accordance with the tenth embodiment. The configuration of the position sensing device D in this embodiment is the same as that in the eighth embodiment, except that the optical path changing mirror 73 has a different shape, so the configuration will not be described again.

With the position sensing device D in this embodiment, an MEMS is used to pivot the reflective face 720 of the test light generator 72. As discussed above, an MEMS pivots by means of the force of an actuator and the elastic force of an elastic support. In pivoting under elastic force, the force generated varies with the twisting angle, and this affects the rate of pivoting. Consequently, the rate at which the test light spot moves ends up being uneven, and an object in the sensing area Sa is not sensed as accurately. In view of this, as shown in FIG. 25, the first mirror 731 and the second mirror 732 are given a convex shape, so that the optical paths of reflected light at regular time intervals are aligned equidistantly.

With this configuration, movement in the main scanning direction of the test light emitted from the first light exit position 101 and the second light exit position 102 will be at a constant or substantially constant speed, and a sensing object can be sensed more accurately. Although the first mirror 731 and second mirror 732 are given a convex shape here, this is not the only option.

In the illustrated embodiment, with the position sensing device D as mentioned above, the first and second mirrors 731 and 732 (e.g., reflective faces) have a shape such that scanning rate of the test lights (e.g., scanning lights) in the sensing area Sa (e.g., predetermined area) is a constant.

Eleventh Embodiment

Figure 26:
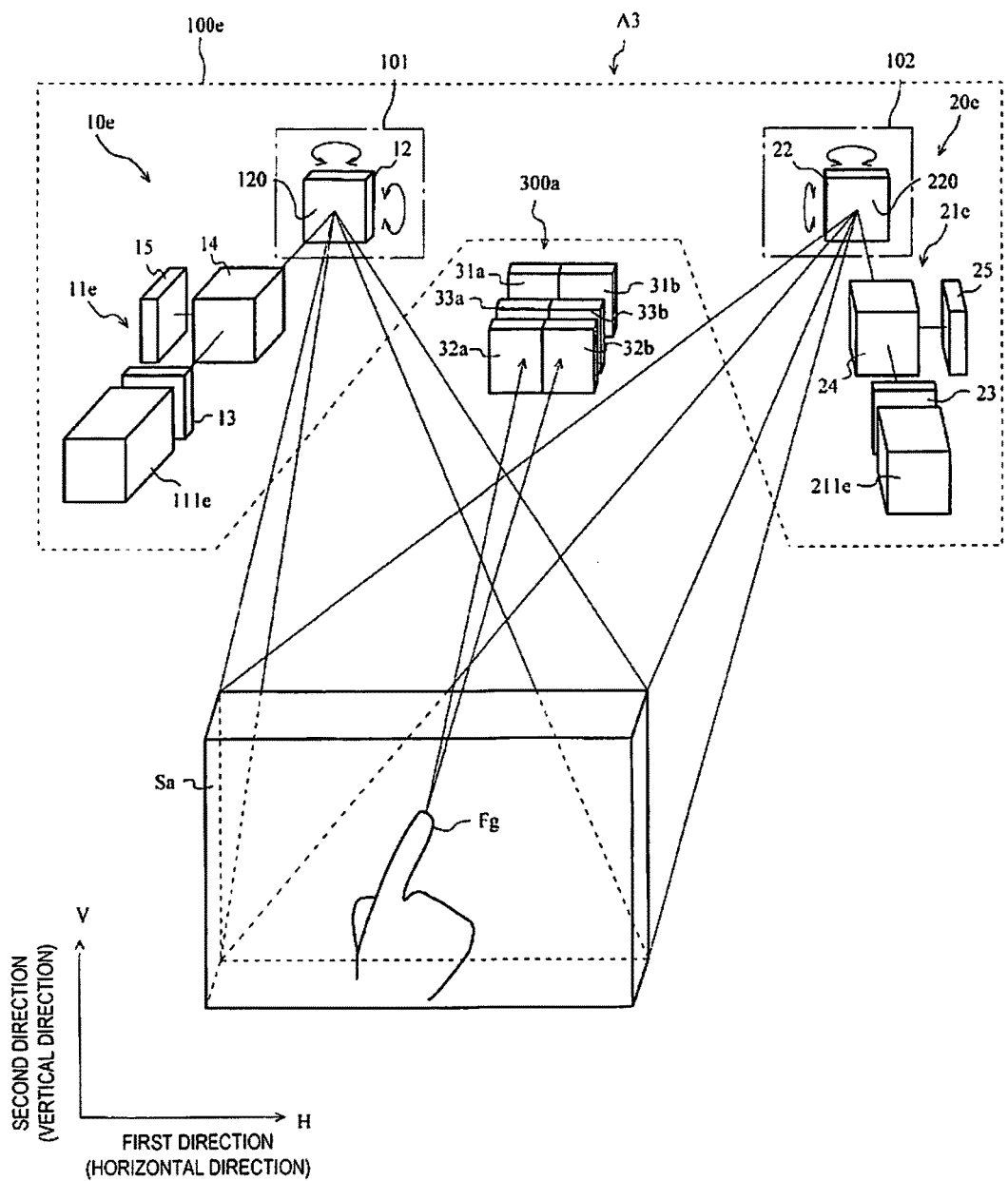
FIG. 26 is a simplified layout diagram of yet another example of the position sensing device in accordance with an eleventh embodiment.
Figure 27:
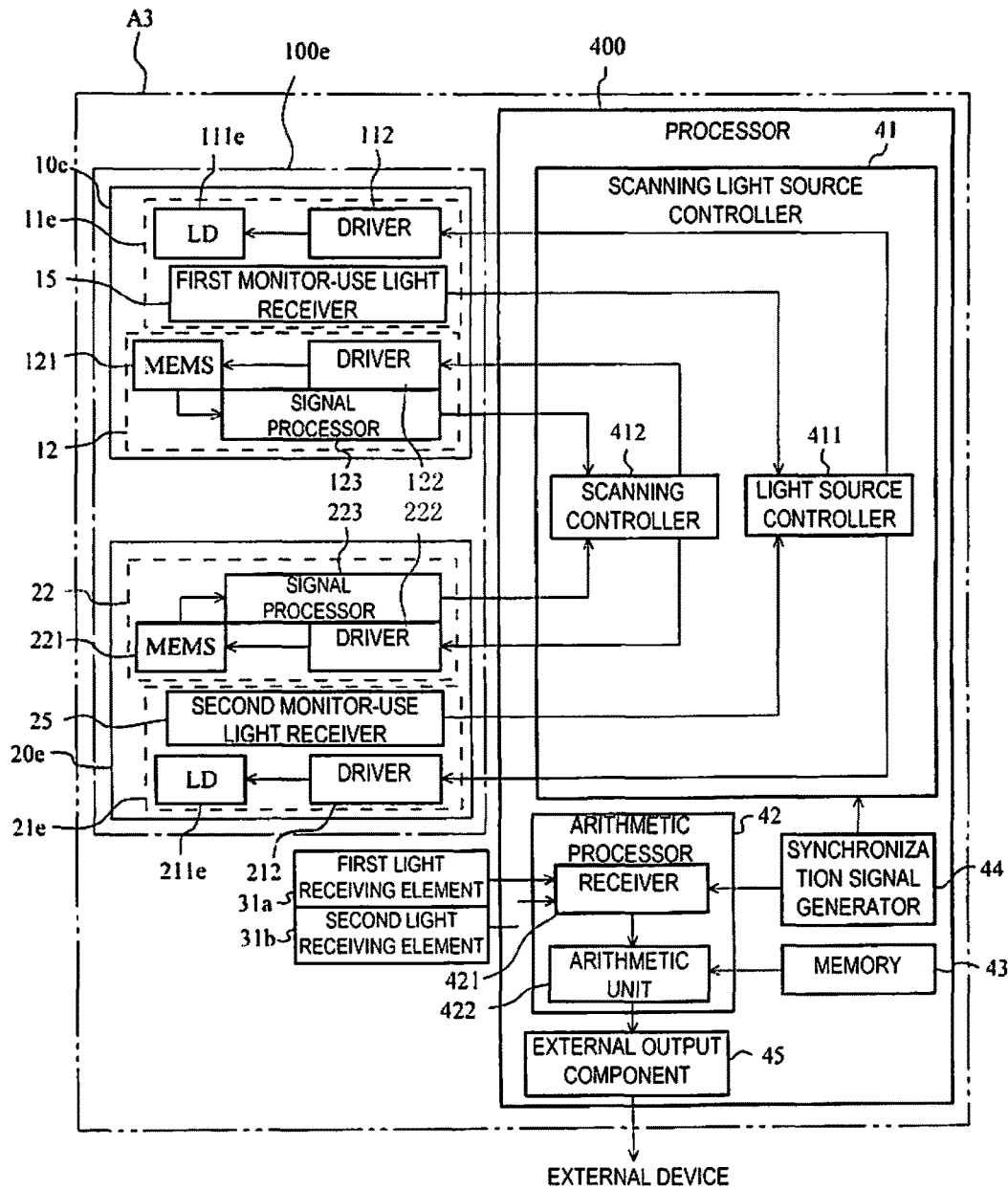
FIG. 27 is a block diagram of how the position sensing device shown in FIG. 26 is connected.
Figure 28:
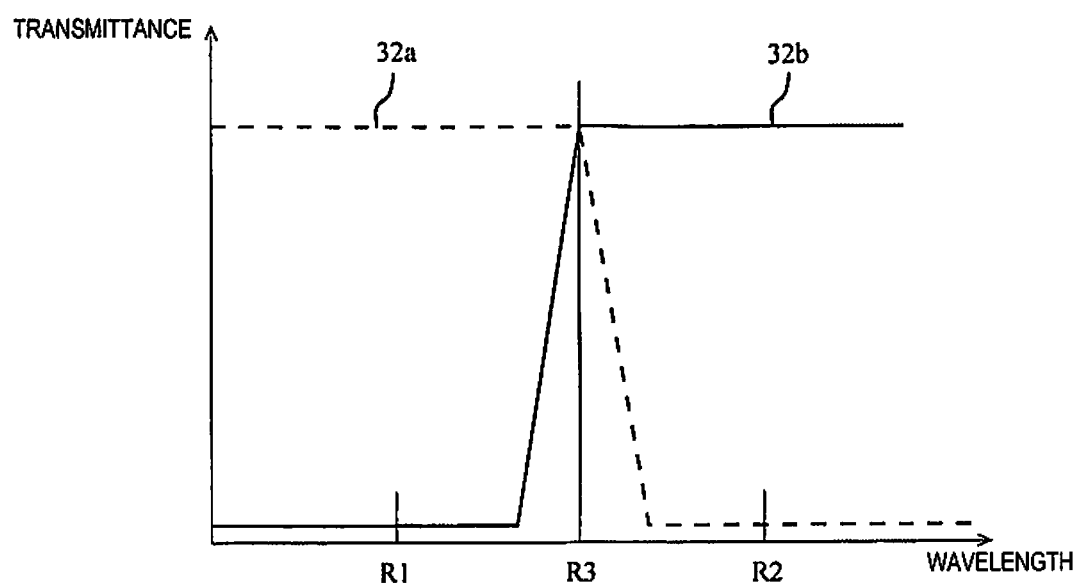
FIG. 28 is a graph of the transmission wavelength of a filter provided to the light receiver of the position sensing device shown in FIG. 26.

Another example of the position sensing device in accordance with an eleventh embodiment will now be described through reference to the drawings. FIG. 26 is a simplified layout diagram of yet another example of the position sensing device in accordance with the eleventh embodiment. FIG. 27 is a block diagram of how the position sensing device shown in FIG. 26 is connected. FIG. 28 is a graph of the transmission wavelength of a filter provided to the light receiver of the position sensing device shown in FIG. 26. The position sensing device A3 shown in FIG. 26 has the same configuration as the position sensing device A, except that it includes a scanning light source component 100e and a light receiver 300a. Therefore, those components of the position sensing device A3 that are substantially the same as in the position sensing device A will be numbered the same and will not be described again in detail.

The scanning light source component 100e includes a first optical system 10e and a second optical system 20e. The first optical system 10e includes a first light source component 11e that includes a laser light emitting element 111e that emits infrared light with a wavelength R1, and a first test light generator 12. The first light source component 11e is optimized to infrared light with the wavelength R1, but the basic configuration is the same as that of the first light source component 11, so components that are the same will be numbered the same and will not be described again in detail.

Meanwhile, the second optical system 20e includes a second light source component 21e that includes a laser light emitting element 211e that emits infrared light with a wavelength R2, and a second test light generator 22. The second light source component 21e is optimized to infrared light with the wavelength R2, but the basic configuration is the same as that of the second light source component 21, so components that are the same will be numbered the same and will not be described again in detail.

More specifically, with the position sensing device A3, the scanning light source component 100e emits test light of the wavelength R1 from the first light exit position 101, and emits infrared light of the wavelength R2 from the second light exit position 102.

The light receiver 300a has a first light receiving element 31a and a second light receiving element 31b disposed in alignment. A lens 33a is provided adjacent to the light receiving face of the first light receiving element 31a, and a lens 33b adjacent to the second light receiving element 31b. Furthermore, a first filter 32a that transmits infrared light of the wavelength R1 and blocks infrared light of the wavelength R2 is provided near the opposite side of the first lens 33a from the first light receiving element 31a. Also, a second filter 32b that blocks infrared light of the wavelength R1 and transmits infrared light of the wavelength R2 is provided near the opposite side of the second lens 33b from the second light receiving element 31b.

The vertical axis in FIG. 28 transmittance, and the horizontal axis is wavelength. If we assume that the wavelength R1<the wavelength R2, then the first filter 32a, as shown in FIG. 28, can be a low-pass filter that cuts out wavelengths of R3 or higher (R1<R3<R2). The second filter 32b can be a high-pass filter that cuts out wavelengths of R3 or lower. This is not the only option, however, and a band pass filter that transmits the various light reception wavelengths may be provided.

As shown in FIG. 27, the first light receiving element 31a and the second light receiving element 31b each individually send light reception signals to the receiver 421. The receiver 421 associates the light reception signal from the first light receiving element 31a and the light reception signal from the second light receiving element 31b with a synchronization signal, and sends the result to the arithmetic unit 422.

The first light source component 11e and the second light source component 21e emit light of different wavelengths, and since light of each wavelength is selectively received by the first light receiving element 31a and the second light receiving element 31b, it is easy to determine whether the light was emitted from the first light exit position 101 or the second light exit position 102.

Also, since the light beams have different wavelengths, even if the light beams emitted from the first light source component 11e and the second light source component 21e simultaneously illuminate the sensing area Sa, it will still be possible to determine from which light source (light exit position) the light was emitted. Therefore, with the position sensing device A3, the timing of emission need not be synchronized for the test light from the first light exit position 101 and the test light from the second light exit position 102. For example, test light from the first light exit position 101 and test light from the second light exit position 102 may illuminate the sensing area Sa at the same time.

In this embodiment, test light of different wavelengths is emitted in order to identify the test light, but this is not the only option. For instance, the configuration may include a scanning light source component that causes light of different polarization directions to be incident in the sensing area, and a polarization filter that transmits or blocks according to the polarization direction in addition to a band pass filter or instead of a band pass filter.

In the illustrated embodiment, with the position sensing device A3 as mentioned above, the light receiver 300a (e.g., at least one light receiver) has the same number (two) of first and second light receiving elements 31a and 31b with first and second filters 32a and 32b (e.g., light receivers) as the first and second light exit positions 101 and 102 (e.g., light exit positions). The test lights (e.g., lights or scanning lights) from the first and second light exit positions 101 and 102 have different wavelengths R1 and R2 with respect to each other. The first and second light receiving elements 31a and 31b with the first and second filters 32a and 32b have band properties to receive the test lights (e.g., lights or scanning lights) from the corresponding light exit positions 101 and 102, respectively.

Twelfth Embodiment

Figure 29:
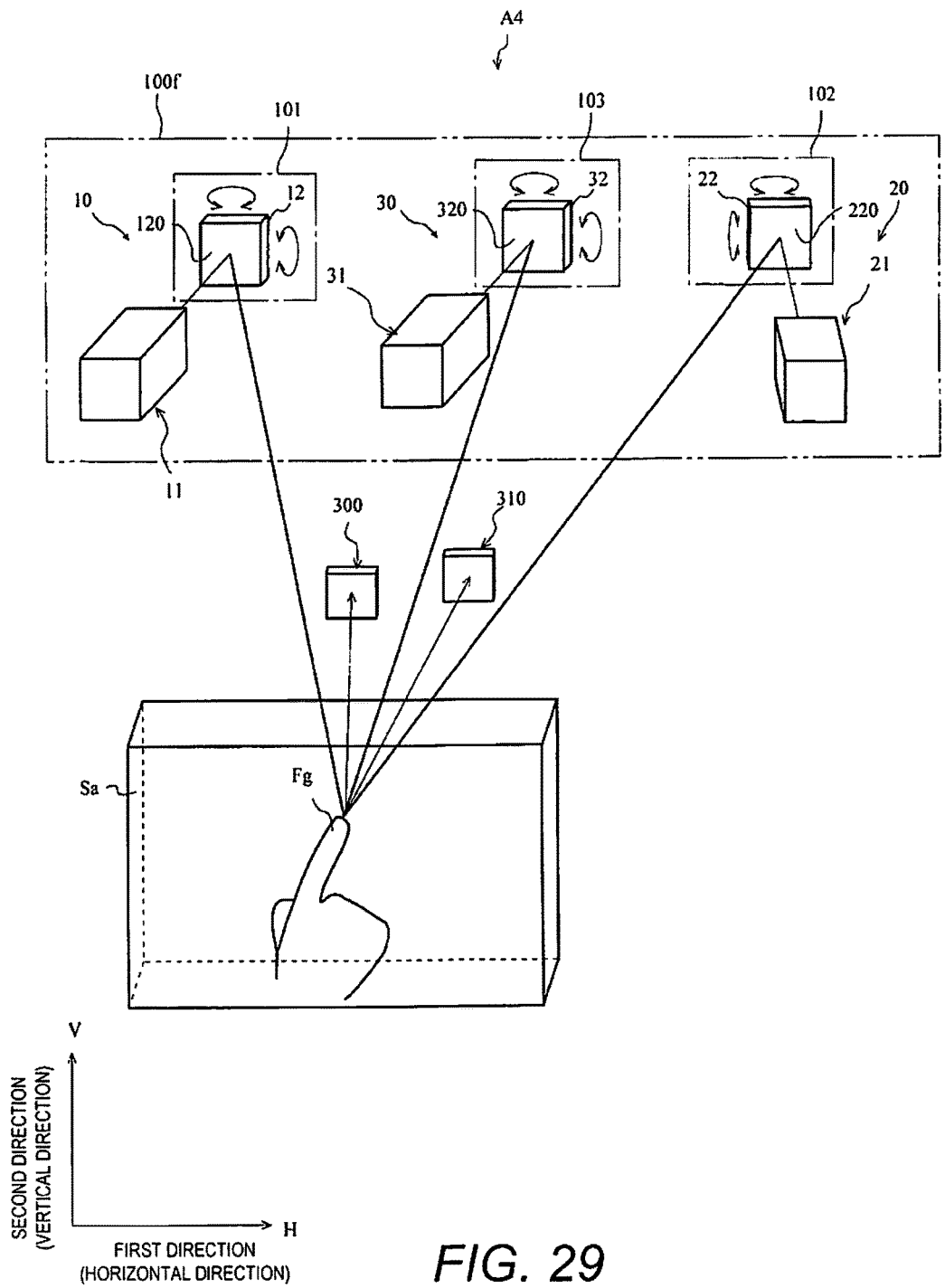
FIG. 29 is a simplified configuration diagram of the position sensing device in accordance with a twelfth embodiment.
Figure 30:
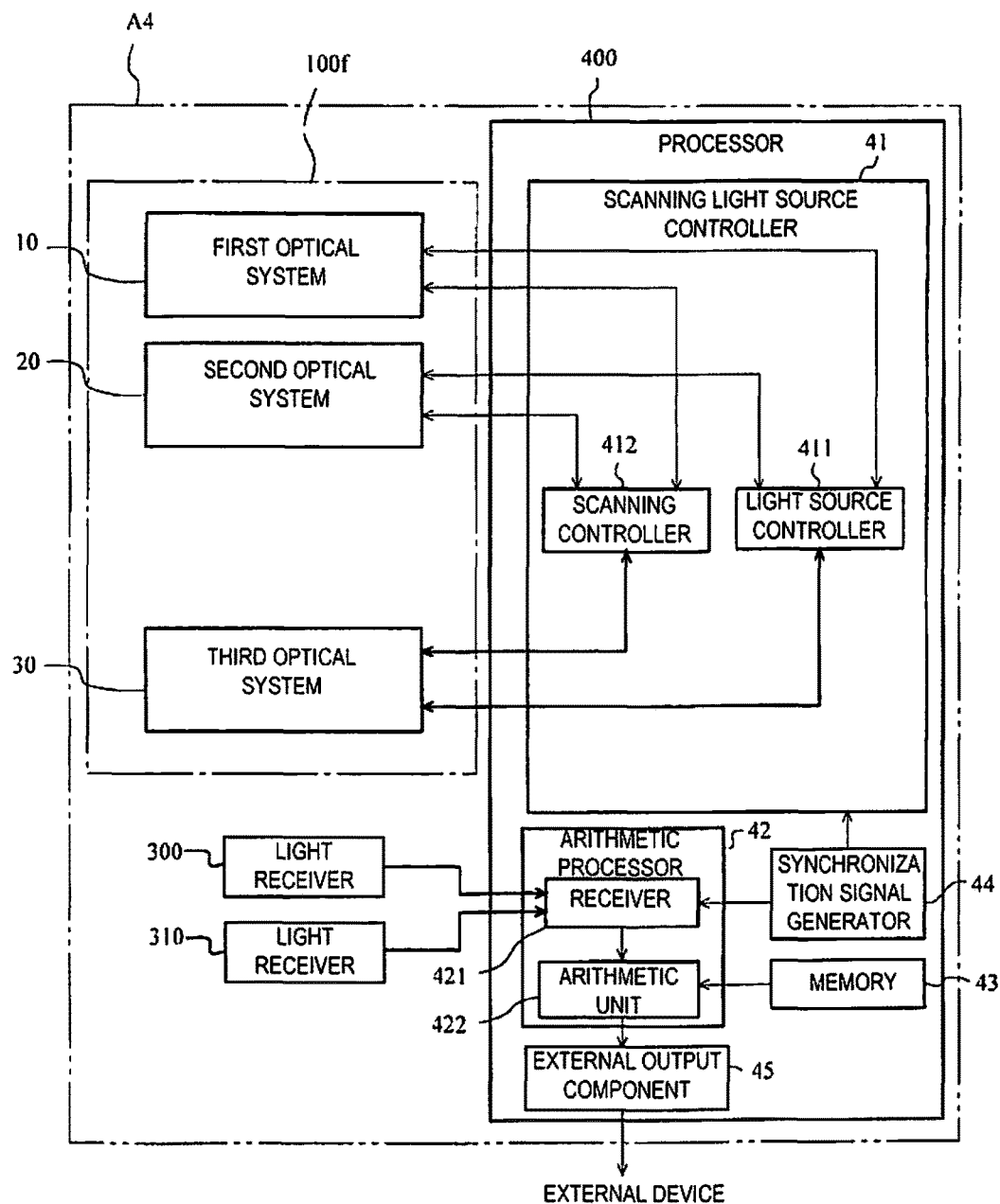
FIG. 30 is a block diagram of the electrical connections of the position sensing device shown in FIG. 29.

FIG. 29 is a simplified configuration diagram of the position sensing device in accordance with a twelfth embodiment. FIG. 30 is a block diagram of the electrical connections of the position sensing device shown in FIG. 29. The position sensing device A4 shown in FIGS. 29 and 30 includes a scanning light source component 100f, a light receiver 300, and a light receiver 310. Although not depicted in the drawing, a processor that is the same as the processor 400 is provided. The light source position sensing device A4 has substantially the same configuration as the position sensing device A, except that it includes three light exit positions and two light receivers 300 and 310, so components that are substantially the same are numbered the same and will not be described again in detail.

The scanning light source component 100f of the position sensing device A4 shown in FIGS. 29 and 30 includes the first light exit position 101, the second light exit position 102, and a third light exit position 103. The first light exit position 101, second light exit position 102, and third light exit position 103 are respectively provided with the first optical system 10, the second optical system 20, and a third optical system 30. The first optical system 10, second optical system 20, and third optical system 30 have substantially the same configuration, and will therefore not be described in detail.

With the position sensing device A, the sensing area Sa is two-dimensionally scanned with test light from the first light exit position 101 and the second light exit position 102, and the three-dimensional coordinates of a sensing object are computed by using the first light exit position 101 and the second light exit position 102 as a reference. With just two light exit positions, distortion or movement of a sensing object may make it impossible to acquire the three-dimensional coordinates of the sensing object. Therefore, the third light exit position 103 is disposed so as to emit test light at a position that would be difficult to illuminate with just the test light from the first light exit position 101 and the second light exit position 102. Furthermore, the light receiver 310 is provided in addition to the light receiver 300. The light receiver 310 has the same configuration as the light receiver 300, and is disposed at a position where it can receive reflected and/or scattered light that could not be received by the light receiver 300.

The light receiver 300 and the light receiver 310 are both connected to the receiver 421, and light reception signals from the light receiver 300 and the light receiver 310 are received by the receiver 421. The scanning light source component 41 controls the first optical system 10, second optical system 20, and third optical system 30 so that the scanning of the sensing area Sa with the test light emitted from the first light exit position 101, second light exit position 102, and third light exit position 103 is performed in time series. Therefore, the arithmetic unit 422 can confirm from the synchronization signal and the light reception signal whether the test light was emitted from the first optical system 10, the second optical system 20, or the third optical system 30.

Also, providing three light exit positions also makes it possible to acquire the shape of a sensing object within the sensing area Sa.

With the position sensing device A4 in this embodiment, three light exit positions and two light receivers are provided, but this is not the only option, and there may be more than three light exit positions. Also, there may be just one light receiver, or two or more of them.

Embodiments of the present invention were described above, but the present invention is not limited to or by the content of these embodiments. Also, various modifications are possible without departing from the gist of the invention. Also, the above embodiments examples can be combined as needed.

To achieve the stated object, the present invention provides a position sensing device having a scanning light source component that emits test light from a plurality of different light exit positions and scans a sensing area with the test light emitted from the various light exit positions, a light receiver that receives sensing light reflected or scattered by a sensing object located in the sensing area and outputs a light reception signal, and a processor that controls the scanning light source component and calculates the position of the sensing object based on the light reception signal, wherein the processor determines from which light exit position the light reception signal is obtained by receiving the sensing light based on the test light that is emitted, and senses the position of the sensing object by computation based on the optical path of the test light thus determined.

With this configuration, the position of the sensing object can be calculated by scanning the sensing area with the test light emitted form a plurality of light exit positions, and detecting the light reflected or scattered by the sensing object located within the sensing area, so there is more latitude in the position where the light receiver is attached. Accordingly, there are fewer restrictions on the shape and installation location of the position sensing device, and the device can be made more compact.

The above configuration may be such that the scanning light source component includes a light source that emits light, and an test light generator that generates test light by moving the optical path of the light in a first direction and in a second direction that intersects the first direction, and the processor controls the drive of the light source and the test light generator. With this configuration, it is easy to drive the light source and the test light generator in synchronization. Consequently, the position of the sensing object can be accurately sensed.

The above configuration may be such that a reflector that reflects test light generated by the test light generator toward the sensing area is provided to at least one of the light exit positions. With this configuration, since the optical path of the test light can be changed by the reflector, there is greater latitude in the layout of the members of the position sensing device. Examples of the members include a light source and an test light generator, but are not limited to these.

The above configuration may be such that the light source and the test light generator are provided in the same number as the light exit positions to the scanning light source component. Providing the same numbers of light sources and test light generators allows the test light to accurately illuminate the sensing area, and allows the sensing area to be scanned with the test light without any gaps.

The above configuration may be such that the processor stops the emission of test light from the other light exit position when test light is being emitted from one light exit position, and the processor acquires information about the time when the light receiver has received sensing light. With this configuration, since the emission of test light is performed exclusively in time series, the light exit position where the sensing light is emitted can be identified even though there are few light receivers. Consequently, the configuration can be simplified, and a sensing object within the sensing area can be accurately sensed.

The above configuration may be such that the processor starts the scanning of the sensing area with the test light emitted from the next light exit position after the scanning of the entire sensing area with the test light emitted from one light exit position has ended. With this configuration, it is easier to synchronize the scanning, and control can be simplified.

The above configuration may be such that two of the light exit positions are provided, and the processor controls the scanning light source component so that the scanning return period of the test light emitted from the various light exit positions is shifted, and the light exit position from which the test light is emitted is switched every time one line is scanned with the test light, thereby performing reciprocal scanning with the test light from the other light exit position when one light exit position is in its return period. With this configuration, there is no need for the two test light generators to be operated in synchronization, and a sensing object can be sensed simply and accurately. Also, since the control is so simple, the controller can be simplified, which reduces manufacturing costs. Furthermore, test light generators of different drive frequencies can be used. This allows test light generators with lower drive frequency accuracy to be used.

The above configuration may be such that there are the same number of the light receivers as the light exit positions, the scanning light source component is formed so as to emit test light of different wavelengths from the various light exit positions, and the light receivers receive light of the same wavelength as the light emitted from the corresponding light exit positions. With this configuration, from which light exit position the test light is emitted can be determined even when test light is emitted from two or more places at the same time. Consequently, there is less deviation in time when scanning with test light from multiple light exit positions, and the sensing object can be sensed more accurately. Also, since a plurality of beams of test light are emitted at the same time, there is no need to synchronize multiple light sources and multiple test light generators, so the scanning light source controller can be simplified. This allows manufacturing costs to be reduced without lowering the accuracy with which a sensing object is sensed.

The above configuration may be such that the same number of light sources as the light exit positions are provided to the scanning light source component, a smaller number of the test light generators than the light sources are provided, and the light sources are disposed so that their light will be incident at different angles on the test light generators, and are disposed so that the test light will be incident at the corresponding light exit positions.

The above configuration may be such that the scanning light source component comprises one light source, one test light generator, and an optical path switching component for alternatively switching the optical path of the test light to any of the light exit positions. With this configuration, the number of light sources and test light generators can be reduced, and manufacturing costs will be lower. Also, there will be greater freedom in the layout of the light sources and test light generators, depending on the layout of the member that converts the optical path of the test light.

The above configuration may be such that the optical path switching component comprises a polarization switching component that is disposed between the light source and the test light generator and switches the polarization direction of light, and a polarized beam splitter that is provided along the optical path of the test light between the test light generator and the light exit positions, and that switches the optical path of the test light by reflecting or transmitting light depending on the polarization direction.

The above configuration may be such that the optical path switching component comprises a reflection member that includes a reflective face that selectively reflects the test light to one of a plurality of reflectors depending on the incidence position of the first direction of the test light.

The above configuration may be such that the reflective face has a split face that is split in the first direction.

The above configuration may be such that the reflective face has a shape such that the scanning rate with the test light in the sensing area will be a constant rate.

The above configuration may be such that the scanning light source controller can controls the exit light of the light source so that the emission of light will stop before or after switching of the light exit position at which the test light is incident.

The present invention provides a position sensing device with which members can be laid out with greater freedom, and the position of a sensing object in a sensing area can be sensed accurately.

The present invention also provides a spatial input device with which input from the user's finger to a spatial image can be reliably detected with a simple configuration.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A position sensing device comprising:
   at least one light receiver that receives lights that are emitted from a plurality of light exit positions of a scanning light source component exclusively in time series to scan a predetermined area and are reflected by a sensing object within the predetermined area; and
   a processor that controls the scanning light source component to emit the lights from the light exit positions exclusively in time series, and senses position of the sensing object based on a light reception signal of the light receiver,
   the processor further determining from which of the lights the light reception signal is obtained, and sensing the position of the sensing object by calculating a closest point of optical paths of the lights, with the optical paths being defined between the light exit positions and the sensing object, respectively,
   the scanning light source component including
      at least one light source that emits light,
      at least one scanning light generator that moves optical path of the light from the light source in a first direction and in a second direction that intersects the first direction,
      an optical path switching component that alternately guides the optical path of the light to the light exit positions, and
      a polarization switching component that is disposed between the light source and the scanning light generator and switches a polarization direction of the light,
   the processor controlling the light source and the scanning light generator, and the optical path switching component including a polarized beam splitter that is disposed between the scanning light generator and the light exit positions and selectively guides the optical path of the light to the light exit positions by reflecting or transmitting the light according to the polarization direction of the light.

2. The position sensing device according to claim 1, wherein
the scanning light source component includes a reflector that is disposed at at least one of the light exit positions, and that reflects the light from the scanning light generator toward the predetermined area.

3. The position sensing device according to claim 1, wherein
while the light is being emitted from one of the light exit positions, the processor stops emission of the light from the other one of the light exit positions, and acquires time information about when the light receiver has received the reflection of the light.

4. The position sensing device according to claim 1, wherein
after scanning the predetermined area entirely with the light from one of the light exit positions, the processor starts scanning the predetermined area with the light from the other one of the light exit positions.

5. The position sensing device according to claim 1, wherein
return periods of the lights from the light exit positions are offset with respect to each other,
emissions of the lights from the light exit positions are alternated every time one line is scanned, and
while the light from one of the light exit positions is in the return period, the predetermined area is reciprocally scanned with the light from the other one of the light exit positions.

6. A position sensing device comprising:
at least one light receiver that receives lights that are emitted from a plurality of light exit positions of a scanning light source component exclusively in time series to scan a predetermined area and are reflected by a sensing object within the predetermined area; and
a processor that controls the scanning light source component to emit the lights from the light exit positions exclusively in time series, and senses position of the sensing object based on a light reception signal of the light receiver,
the processor further determining from which of the lights the light reception signal is obtained, and sensing the position of the sensing object by calculating a closest point of optical paths of the lights, with the optical paths being defined between the light exit positions and the sensing object, respectively,
the scanning light source component including
at least one light source that emits light,
at least one scanning light generator that moves optical path of the light from the light source in a first direction and in a second direction that intersects the first direction, and
an optical path switching component that alternately guides the optical path of the light to the light exit positions,
the processor controlling the light source and the scanning light generator, and
the optical path switching component including a reflection member that has a reflective face that selectively reflects the light to a plurality of reflectors according to incidence position of the light on the reflective face in the first direction.

7. The position sensing device according to claim 6, wherein the reflective face is split in the first direction.

8. The position sensing device according to claim 6, wherein
the processor controls the light source to stop emitting the light while switching the light exit positions.

9. The position sensing device according to claim 6, wherein
the reflective face has a shape such that scanning rate of the lights in the predetermined area is a constant.

10. The position sensing device according to claim 1, wherein
the processor senses the position of the sensing object based on a table indicative of relationship between coordinate and the optical paths of the lights.

11. The position sensing device according to claim 1, wherein
the light receiver detects the sensing object based on a predetermined threshold.

12. The position sensing device according to claim 1, wherein
the light from one of the light exit positions is repeatedly emitted without emitting the light from the other one of the light exit positions while the light receiver does not receive the light from the one of the light exit positons that is reflected by the sensing object within the predetermined area.

13. The position sensing device according to claim 1, wherein
the processor senses the position of the sensing object as an intersection of the optical paths of the lights.

14. A spatial input device comprising:
the position sensing device according to claim 1; and
an image formation component that forms an image in the predetermined area.

15. A position sensing method comprising:
emitting lights from a plurality of light exit positions of a scanning light source component exclusively in time series to scan a predetermined area;
receiving, by at least one light receiver, the lights that are reflected by a sensing object within the predetermined area;
controlling the scanning light source component to emit the lights from the light exit positions exclusively in time series; and
sensing position of the sensing object based on a light reception signal in response to the receiving of the lights,
the sensing of the position further including determining from which of the lights the light reception signal is obtained, and sensing the position of the sensing object by calculating a closest point of optical paths of the lights, with the optical paths being defined between the light exit positions and the sensing object, respectively,
the controlling of the scanning light source component including
controlling at least one light source to emit light, and
controlling at least one scanning light generator to move optical path of the light from the light source in a first direction and in a second direction that intersects the first direction,
the emitting of the lights from the light exit positions including alternately guiding, by an optical path switching component, the optical path of the light to the light exit positions, and switching, by a polarization switching component that is disposed between the light source and the scanning light generator, a polarization direction of the light, and the alternately guiding of the optical path of the light to the light exit positions including selectively guiding, by a polarized beam splitter of the optical path switching component that is disposed between the scanning light generator and the light exit positions, the optical path of the light to the light exit positions by reflecting or transmitting the light according to the polarization direction of the light.

16. The position sensing method according to claim 15, wherein the controlling of the scanning light source component includes controlling at least one light source that emits light, and at least one scanning light generator that moves optical path of the light from the light source in a first direction and in a second direction that intersects the first direction.

17. The position sensing method according to claim 15, wherein the controlling of the scanning light source component includes stopping emission of the light from one of the light exit positions while the light is being emitted from the other one of the light exit positions, and the sensing of the position includes acquiring time information about when the reflection of the light has been received.

18. The position sensing method according to claim 15, wherein return periods of the lights from the light exit positions are offset with respect to each other, emissions of the lights from the light exit positions are alternated every time one line is scanned, and while the light from one of the light exit positions is in the return period, the predetermined area is reciprocally scanned with the light from the other one of the light exit positions.

* * * * *